(12) United States Patent
Pollock

(10) Patent No.: US 7,985,341 B2
(45) Date of Patent: Jul. 26, 2011

(54) CIRCULAR CLARIFIER APPARATUS AND METHOD

(75) Inventor: David C. Pollock, Calgary (CA)

(73) Assignee: Noram Engineering and Construction Ltd., Vancouver, B.C. (CA)

( * ) Notice: Subject to any disclaimer, the term of this patent is extended or adjusted under 35 U.S.C. 154(b) by 1017 days.

(21) Appl. No.: 11/880,816

(22) Filed: Jul. 23, 2007

(65) Prior Publication Data

US 2007/0289912 A1    Dec. 20, 2007

Related U.S. Application Data

(62) Division of application No. 10/801,383, filed on Mar. 12, 2004, now Pat. No. 7,258,788.

(51) Int. Cl.
*C02F 1/24* (2006.01)
*B01D 21/18* (2006.01)

(52) U.S. Cl. .................................... 210/703; 210/776
(58) Field of Classification Search .................. 210/703, 210/776
See application file for complete search history.

(56) References Cited

U.S. PATENT DOCUMENTS

| | | | |
|---|---|---|---|
| 2,695,710 A | | 11/1954 | Gibbs |
| 2,742,422 A | * | 4/1956 | Coleman et al. ............. 210/96.1 |
| 2,780,361 A | | 2/1957 | Evans et al. |
| 3,465,887 A | | 9/1969 | Cookney |
| 3,498,465 A | | 3/1970 | Klump et al. |
| 3,627,132 A | | 12/1971 | Kelly et al. |
| 3,733,272 A | | 5/1973 | Burns |
| 3,741,399 A | * | 6/1973 | Peterson ..................... 210/525 |
| 3,794,171 A | | 2/1974 | Kimura et al. |
| 3,820,659 A | | 6/1974 | Parlette |
| 3,828,935 A | | 8/1974 | Rovel |
| 3,864,257 A | | 2/1975 | Shaffer |
| 3,919,090 A | | 11/1975 | Shaffer |
| 4,070,277 A | * | 1/1978 | Uban et al. ..................... 209/168 |
| 4,094,338 A | | 6/1978 | Bauer |
| 4,184,967 A | * | 1/1980 | Krofta ........................... 210/525 |

(Continued)

FOREIGN PATENT DOCUMENTS

CA    1096516    2/1981

(Continued)

*Primary Examiner* — Thomas M Lithgow
(74) *Attorney, Agent, or Firm* — Oyen Wiggs Green & Mutala LLP

(57) ABSTRACT

This application relates to a circular clarifier for separating and removing separable matter, such as suspended solids, from a liquid. The invention may be used, for example, for separating return activated sludge from clarified liquor using a gas flotation process. The clarifier includes a plurality of fluid feed ports for introducing influent into selected treatment cells of the clarifier in a timed sequence, thereby achieving batch flotation of solids or other separable matter in a continuous infeed process. A plurality of spaced-apart, rotating flocculent handling assemblies traverse the treatment cells for sequentially conveying flocculent into spaced-apart, radially extending collection troughs. All of the flocculent handling assemblies may be driven by a single drive means. Each flocculent handling assembly includes a submerged beach and a scraper assembly including a scraper blade which extends upwardly from the beach. The beaches provide a shear plane underneath the surface layer of flocculent. The scraper assembly includes means for lifting the scraper blade in the vicinity of a trough to enable the blade to traverse over the trough and then descend to a position in contact with or proximate to a corresponding beach. Methods of using the clarifier to more efficiently handle return activated sludge or other fragile flocculent are also described. The clarifier may be stand-alone or adapted to retrofit existing circular primary or secondary sedimentation clarifiers.

31 Claims, 23 Drawing Sheets

U.S. PATENT DOCUMENTS

| | | |
|---|---|---|
| 4,279,754 A | 7/1981 | Pollock |
| 4,287,070 A | 9/1981 | Pollock |
| 4,367,146 A | 1/1983 | Pollock et al. |
| 4,407,718 A | 10/1983 | Pollock |
| 4,931,175 A | 6/1990 | Krofta |
| 5,047,151 A | 9/1991 | Brandkvist |
| 5,200,079 A | 4/1993 | Schwartz et al. |
| 5,268,099 A | 12/1993 | Krofta et al. |
| 5,296,149 A | 3/1994 | Krofta |
| 5,330,660 A | 7/1994 | Kettenbach |
| 5,513,903 A | 5/1996 | Mraz |
| 5,645,726 A | 7/1997 | Pollack |
| 5,650,070 A | 7/1997 | Pollock |
| 5,651,892 A | 7/1997 | Pollock |
| 5,660,718 A | 8/1997 | Chudacek et al. |
| 5,660,724 A | 8/1997 | Pollock |
| 6,083,389 A | 7/2000 | Susa |
| 6,174,434 B1 | 1/2001 | Krofta |
| 6,468,429 B1 | 10/2002 | Pollock |

FOREIGN PATENT DOCUMENTS

| | | |
|---|---|---|
| CA | 1120408 | 3/1982 |
| CA | 2047379 | 3/1992 |
| CA | 2111473 | 10/1993 |
| CA | 2165793 | 1/1995 |
| CA | 2184750 | 9/1995 |
| CA | 2155811 | 2/1996 |
| CA | 2250552 | 4/1999 |
| CA | 2323144 | 9/1999 |
| CA | 2431438 | 6/2002 |
| EP | 0001418 A1 | 4/1979 |
| FR | 2693922 A1 | 1/1994 |
| JP | 55019473 | 2/1980 |
| JP | 55132682 | 10/1980 |
| JP | 55132683 | 10/1980 |
| JP | 56015853 | 2/1981 |
| JP | 58074180 | 5/1983 |
| JP | 60058288 | 4/1985 |
| JP | 60244309 | 12/1985 |
| JP | 63020086 | 1/1988 |
| JP | 08066680 | 3/1996 |
| JP | 08132034 | 5/1996 |
| JP | 08309107 | 11/1996 |
| JP | 09141257 | 6/1997 |
| JP | 09164384 | 6/1997 |
| JP | 10043508 | 2/1998 |
| JP | 11005083 | 1/1999 |
| JP | 11114317 | 4/1999 |
| JP | 2001113270 | 4/2001 |
| JP | 2002001323 | 1/2002 |
| WO | WO8200135 | 1/1982 |
| WO | WO9001982 | 3/1990 |
| WO | WO9528214 | 10/1995 |
| WO | WO9600120 | 1/1996 |

* cited by examiner

Particle size organic characterization and related treatment technologies: (a) particle sizes and approximate molecular masses of wastewater organics and (b) treatment technologies.

WEF MOP 8 – Design of Municipal Wastewater Treatment Plants (Vol. I, p. 46)

Cross-Section of Functional Model

CIRCULAR CLARIFIER APPARATUS AND METHOD

RELATED APPLICATIONS

This is a Divisional of application Ser. No. 10/801,383, filed Mar. 12, 2004 now U.S. Pat. No. 7,258,788.

TECHNICAL FIELD

This application relates to a circular clarifier for removing separable matter from a liquid medium, for example by a gas flotation process. The separable matter may include suspended solids, such as return activated sludge.

BACKGROUND

Clarifiers are well-known in the prior art for separating suspended solids from clarified liquor. Most clarifiers operate by sedimentation of solids (i.e. solids sink and are collected from a bottom portion of the clarification vessel) or flotation (i.e. solids are caused to float and are removed as a flotation blanket from the surface of the clarification vessel). Conventional dissolved air flotation (DAF) clarifiers are not typically used in applications where secondary quality effluent is desired, especially in plants having high flow rates. This is primarily due to the substantial amount of energy required for the pressurization of air and recycle water in the reaction chamber. However, in applications where DAF clarifiers have been used, it has been shown that particle sizes from 0.5-500 microns can be easily separated from the mother liquor by flotation whereas sedimentation clarification is limited to particle sizes of roughly 50-500 microns. FIG. 1, which is derived from a Water Environment Federation Manual of Practice[1], compares various treatment technologies for separating wastewater organics from an influent stream, including sedimentation and flotation clarification.

[1]Manual of Practice 8, Design of Municipal Wastewater Treatment Plants, (1991, Vol. I, p. 46)

In practice, most DAF clarifiers are used in applications where high quality effluent is not required. For example, DAF units processing high influent solids concentrations have been used extensively in low flow applications, such as sludge thickeners. Such thickeners produce effluent quality in the 100 mg/L and greater total suspended solids (TSS) range, even with the use of high doses of polymer. DAF units have also been used successfully in high flow installations where the influent solids concentration is relatively low. However, very few DAF units are known in the prior art that can process high concentrations of influent solids and also produce high quality effluent without the use of polymers, particularly when such units are loaded at conventional clarifier design rates.

The flotation separation of biological solids has been successfully achieved by the inventor using deep vertical shaft bioreactors as described in U.S. Pat. Nos. 5,645,726 and 5,650,070. In deep vertical shaft bioreactors, the entire mixed liquor is subjected to pressure and hence dissolved gas forms not only in the liquid around the biomass particle but also within the cell wall of the microbes. This makes a portion of the sludge biomass buoyant for a period of time until the gas concentrations equilibrate across the cell wall. Such bio-flocculent floats faster and forms a thicker float blanket than flocculent attached to the surface of the gas bubbles. The float blanket can, however, be relatively fragile and hence care must be taken in separating the activated sludge from the clarified subnatent.

Most prior art clarifiers exhibit shortcomings in handling fragile flocculent. For example many prior art systems, such as described in U.S. Pat. Nos. 4,279,754 and 5,330,660 employ sloped stationary beaches, the highest point of which, is elevated slightly above the fill level of liquid in the clarifier bowl. At the back of the beach is a sludge collection trough that collects the sludge that is pushed by scrapers onto the sloped beach, up the ramp, and into the trough. The top of the trough is slightly higher than the liquid level in the clarifier to prevent return activated sludge (RAS) flow between scraper discharges. Sludge removal therefore depends on mechanically pushing the sludge up the sloped beach and into the trough. This action requires a relatively highly concentrated (i.e. thick) sludge, a tight scraper-to-beach fit and a mechanically strong sludge float blanket to form in front of the scraper. The sludge float blanket usually needs to be strengthened by the use of polymers.

Thus, in conventional designs, polymers are used primarily to compensate for mechanical design limitations, such as aggressive manipulation of the biomass using scrapers, ramped beaches and elevated RAS troughs protruding above the liquid fill level. Ideally, because of cost, the use of polymers should be eliminated or used only sparingly in secondary flotation clarifiers. However, if use of polymers is limited, the flocculated float solids that form at the surface of the liquid are relatively more fragile than floc formed in sludge thickeners using high dosages of polymer.

Krofta has developed various improvements to flotation clarifier design, as exemplified by U.S. Pat. No. 6,174,434. For example, Krofta recognized the importance of rampless beaches and gravity RAS troughs when handling fragile sludge blankets. However, the Krofta process described in the '434 patent includes the step of dipping a scoop into the sludge, thus disturbing the float, and mechanically elevating the scoop so that the sludge will flow by gravity. While this approach is an ingenious improvement over prior designs, the Krofta flocculent handling assembly is mechanically complex and inefficient.

Most flotation clarifiers described in the prior art are rectangular in construction. One of the critical parameters in rectangular clarifier design is to maximize the width of the beach and the length of the overflow weir. For example, the overflow weir in a rectangular clarifier may be double-sided or trough-shaped to maximize its length. The same design principles apply in the case of circular clarifiers. However, circular clarifiers can exhibit significant process advantages especially when built on a large scale (e.g. 60 feet in diameter or more). For example, large diameter circular clarifiers provide an opportunity to place the overflow weir along the peripheral wall of the clarifier to thereby maximize its length. Rectangular clarifiers suffer from short beach lengths and consequently decreased ability to return solids such as return activated sludge. In circular clarifiers, beaches may be deployed radially to provide a larger effective surface for sludge collection. Also, in circular clarifiers the influent feed may be introduced from a central, inner portion of the clarifier and effluent may be removed from the outer perimeter under relatively quiescent conditions.

The need has therefore arisen for an improved circular flotation clarifier capable of achieving a high degree of separation of float solids or other separable matter at commercially practical loading rates, without the use of polymers and without damaging fragile flocculent.

SUMMARY OF INVENTION

In accordance with the invention a circular clarifier for separating separable matter from a liquid is provided. The clarifier includes an influent supply for introducing the liquid into the clarifier to a fill level; an outlet for discharging effluent from the clarifier; at least one flocculent collection trough extending within the clarifier proximate the fill level; and at least one rotatable flocculent handling assembly comprising a beach movable at an elevation below the trough and a scraper assembly including a scraper blade extending upwardly from the beach above the fill level. The scraper assembly is movable relative to the beach to an elevation above the trough when the flocculent handling assembly traverses past the trough.

In one embodiment of the invention the clarifier may include a plurality of spaced-apart troughs subdividing the clarifier into a plurality of liquid treatment regions, each of the treatment regions being defined between an adjacent pair of the troughs. In this embodiment the scraper assembly is movable relative to the beach to an elevation above each one of the troughs when the flocculent handling assembly traverses thereby.

The clarifier may further include a central hub and a peripheral wall, the hub and the wall defining a container therebetween for containing the liquid. The troughs preferably extend between the hub and the wall at fixed locations. For example, the troughs may be radially extending.

In one embodiment the central hub is stationary and the influent supply comprises a plurality of spaced-apart influent feed ports for permitting regulated flow of the liquid from an interior of the hub into the treatment regions. The feed ports may be located at fixed positions on the hub and may be brought into and out of alignment with movable influent inlet ports to open and close the feed ports. For example, the inlet ports may be formed on a first rotatable ring, wherein rotation of the first rotatable ring relative to the hub periodically brings the feed ports into at least partial register with the inlet ports to permit the introduction of the liquid into the treatment regions. In one embodiment, rotation of the first rotatable ring is timed so that the liquid is introduced into each of the treatment regions at a location behind the direction of travel of the flocculent handling assembly, wherein the liquid in advance of the flocculent handling assembly is thereby maintained relatively quiescent. The feed ports and inlet ports may be configured so that the liquid influent is introduced into the treatment regions in sequence. That is, at any given time some of the feed ports are at least partially open and some of the feed ports are closed.

The clarifier may include a plurality of spaced-apart flocculent handling assemblies each rotatable around the hub and driven by a common drive. Preferably each of the flocculent handling assemblies includes a radially extending beach and a radially extending scraper blade resting on the beach and extending upwardly therefrom. The scraper assembly displaces the scraper blade vertically relative to the corresponding beach in the vicinity of a trough. The clarifier may be configured so that only one of the scraper assemblies traverses over one of the troughs at any given time. Preferably the number of the flocculent handling assemblies differs from the number of the troughs. For example, the clarifier may consist of five flocculent handling assemblies and four troughs. Each of the flocculent handling assemblies is coupled to a second rotatable ring rotatable relative to the hub. The first and second rings may be operatively coupled together and rotate in unison relative to the fixed central hub and the flocculent collection troughs.

The clarifier also preferably includes a holding tank extending within an interior of the hub and a plurality of flocculent discharge ports in communication with the holding tank for periodically permitting discharge of flocculent from the troughs into the holding tank. In order to facilitate discharge of flocculent, each of the troughs is inclined toward a corresponding one of the discharge ports. A hydraulic head difference is preferably maintained between the troughs and the holding tank to ensure that the flocculent flows into the holding tank without the use of pumps when a flocculent discharge port is opened. In one embodiment the clarifier may include an annular outer baffle located in an upper portion of the container in the vicinity of the peripheral wall and an inner baffle surrounding the hub, wherein each of the troughs extends radially between the inner and outer baffles and wherein the flocculent discharge ports are formed on the inner baffle. The clarifier may also include a third rotatable ring comprising a plurality of spaced-apart flocculent outlet ports, wherein said flocculent is intermittently discharged into the holding tank when the movable flocculent outlet ports are brought into at least partial register with the flocculent discharge ports. The first and third rotatable rings may be operatively coupled together and rotate in unison. For example, the first and third rotatable rings may consist of portions of a common cylindrical tube rotatable about the central hub.

The influent supply for introducing influent into the clarifier may include an influent supply chamber in fluid communication with the influent feed ports for containing an aerated supply of the liquid upstream from the feed ports. For example, the influent supply chamber may receive a first stream of the liquid influent comprising dissolved gas from a influent source, such as a deep shaft bioreactor, located upstream from the influent supply chamber. The influent supply chamber may be in fluid communication with the holding tank which receives flocculent from the troughs and optionally recirculates the flocculent to the influent source. Both the influent supply chamber and the holding tank may be located adjacent one another within the central hub. One or more fluid recycle ports adjustable between open and closed positions may be provided for regulating flow of the liquid between the influent supply chamber and the holding tank.

The clarifier may further include one or more sediment recycle ports for adjustably permitting passage of any sediment settling in a bottom portion of the clarifier container into the holding tank. Preferably a plurality of rake assemblies each extending under a corresponding beach and rotatable therewith are provided for conveying sediment toward the sediment recycle ports.

Preferably each of the troughs extends a short distance above the fill level of the liquid within the clarifier container at least part of the time. Each of the troughs may have the shape of a truncated segment of a circle and include a front edge, a rear edge and a trough bottom surface extending therebetween. Each of the beaches comprises an upper surface extending in a substantially horizontal plane and movable through the container at a submerged location below the fill level and below the elevation of the troughs. In operation, a surface layer of flocculent forms at the fill level of the liquid within the container, and each beach creates a shear plane proximate a lower portion of the surface layer as the beach moves through the container. In one embodiment each beach has the shape of a truncated segment of a circle and is coupled to the third rotatable ring rotatable about the central hub. A plurality of vertically disposed baffles preferably extend outwardly from the third rotatable ring between the beaches for regulating flow of the liquid introduced into the container. An outer weir surrounds the outer peripheral wall for collecting the effluent and conveying it to effluent outlet(s).

In operation, rotation of the flocculent handling assemblies at locations between the troughs subdivides each treatment region of the clarifier receiving a flocculent handling assembly into a float subzone in advance of the flocculent handling assembly and a fill subzone in behind of the flocculent handling assembly. The beach defines the lower boundary of the float subzone as the beach approaches a next-in-sequence one of the troughs in the direction of rotation. As the flocculent handling assembly traverses through the treatment region in question, the float subzone progressively decreases in size and the fill zone progressively increases in size, thereby causing at least part of the surface layer of flocculent to rise above the fill level and gently spill over a front edge of the next-in-sequence trough, collecting the flocculent therein. The flocculent handling assembly thereby increases the concentration of the flocculent within the float subzone. Each of the troughs may include a portion for collecting and discharging a waste activated sludge fraction of the flocculent.

A bottom edge of the scraper blade contacts the beach at positions between the troughs. In one embodiment the scraper assembly includes an elongated scraper blade and a vertical adjustment assembly for lifting the scraper blade in the vicinity of a front edge of a trough and lowering the scraper blade in the vicinity of a rear edge of a trough. The scraper blade therefore traverses substantially all of the exposed surface of the treatment regions as it rotates within the container. The vertical adjustment assembly comprises a leading support arm and a trailing support arm each extending between a first end proximate an inner portion of the clarifier container and a second end proximate an outer portion of the container. The vertical adjustment assembly further comprises a mechanical linkage coupling the support arms to each other and to the scraper blade and an actuator for varying the angular spacing between the support arms to thereby cause vertical displacement of the scraper blade.

Preferably the scraper blade extends radially between the inner and outer portions of the container, and the scraper blade rotates in a first arc in a plane of rotation within the container around the hub. The support arms move in a second arc in a support plane parallel to the plane of rotation and extending along a radial axis of the second arc. Preferably the support plane is disposed above the plane of rotation.

The actuator for varying the angular distance between the support arms may include a cam assembly operatively coupled to the leading support arm. The cam assembly may include a cam ring mounted on an actuator support structure, the ring having at least one cam surface formed thereon; and a roller coupled to the first end of the first support arm and located on an inner surface of a second ring rotatable relative to the central hub, wherein the roller is movable on the cam surface as the second ring rotates relative to the central hub to vary the angular distance between the support arms. The clarifier may further include a drive for driving rotation of the second ring relative to the central hub.

The second end of each of the support arms is supported for travel in the second arc around the clarifier container. For example, the scraper assembly may be adapted for travel over a peripheral outer wall of the clarifier remote from the actuator support structure. In this embodiment each of the support arms has a roller mounted on the second end thereof for rolling motion on an upper surface of the peripheral wall.

In one embodiment the second ring comprises at least one slot for receiving the first end of the trailing support arm. An adjustable length tie bar may also be provided for coupling the second end of the leading support arm to the second ring. In operation, the relative angular velocity of the trailing support arm is reduced when the angular distance between the first and second support arms increases, and the relative angular velocity of the trailing support arm is increased when the angular distance between the first and second support arms is reduced.

As indicated above, the scraper assembly is designed to convert rotation of the scraper support arms along a radial line to vertical displacement of the scraper in the vicinity of a trough. In order to achieve this motion, the support arms may extend in the support plane along radial lines corresponding to opposed truncated edges of an outwardly projecting first rhombic pyramid having an apex proximate the first end of the support arms. The linkage connecting the support arms to the scraper blade may include a plurality of first V-shaped first linkage elements extending between the support arms, wherein each of the first linkage elements comprises a first segment connected to the leading support arm and a second segment connected to the trailing support arm. Each of the first and second segments are connected together at first connectors disposed between the support arms. The connectors are located on a radial axis intersecting the first connectors and corresponding to an edge of the first rhombic pyramid located between the opposed edges. Optionally, the linkage may further include a stabilizer shaft extending along the radial axis intersecting the first connectors.

The linkage may further comprise a plurality of second linkage elements for coupling the first connectors to the scraper. The second linkage elements may include a plurality of spaced-apart second connectors on the scraper blade, wherein each of the second connectors is (a) coupled to a corresponding one of the first connectors and (b) is located on the scraper blade at a location in a plane extending perpendicular to the plane of rotation and passing through the trailing support arm at a location where one of the first linkage elements is connected thereto. At least some of the second linkage elements may each further comprise a third connector disposed between the first and second connectors, wherein the third connector is supported for movement in a plane perpendicular to the plane of rotation along an axis intersecting a corresponding one of the first connectors. In a particular embodiment, each of the second linkage elements further comprise third, fourth, fifth and sixth segments together defining a rhombic shape for linking the first and third connectors together, wherein the rhombic shape corresponds to the cross-sectional shape of an inwardly projecting second rhombic pyramid having its apex on the radial axis intersecting the first connectors. A seventh segment may also be provided for coupling each of the third connectors to a corresponding one of the second connectors.

A method of treating influent in a circular clarifier having a container for holding the influent and at least one trough extending at approximately the fill level of the influent is also provided. The method includes the steps of introducing the influent into a treatment region of the container in the vicinity of the trough; causing a fraction of the influent comprising separable matter to form a surface layer of flocculent in a flotation subzone of the treatment region; and confining the flocculent within the flotation subzone while gradually decreasing the volume of the flotation subzone to cause the flocculent to rise above the fill level and gently spill into the trough without substantially disrupting the flocculent. The clarifier preferably comprises a rotatable flocculent handling assembly as described above and the step of gradually decreasing the volume of the flotation subzone comprises rotating the flocculent handling assembly through the treatment region.

Although influent is introduced into the clarifier container continuously, flocculent is floated in different treatment regions sequentially in a batch-like process. According to the method, each treatment region is operable in a fill phase, a float phase or a combination fill/float phase. Rotation of the flocculent handling assembly through the treatment region subdivides the region into the flotation subzone in advance of the direction of travel of the assembly and a fill subzone behind the assembly. The liquid influent is introduced into the fill zone of the treatment region, but not the float subzone, during the fill phase and the fill/float phase.

In another embodiment of the invention a circular flotation clarifier for separating separable matter from a supply of liquid influent is provided comprising a container for holding the liquid; a plurality of troughs extending in the container at spaced-apart locations, wherein the troughs each extend at approximately the surface level of the liquid in the container; a plurality of spaced-apart beaches rotatable relative to the troughs within the container at an elevation below the troughs; and a plurality of scraper blades, each of the blades extending upwardly from a corresponding one of the beaches and being rotatable therewith, wherein the scraper blades subdivide the container into a plurality of rotatable liquid treatment cells, each of the treatment cells being defined between two of the scraper blades. More particularly, each of the treatment cells is defined between a leading scraper blade and a trailing scraper blade and is movable past each of the troughs in sequence in a direction of rotation.

The liquid is introduced into each one of the treatment cells during a fill period commencing when the leading scraper blade passes the rear edge of one of the troughs and ending when the trailing scraper blade passes the rear edge of such trough. Each of the treatment cells may be subdivided during the fill period into a fill subzone between the leading scraper blade and the trough and a float subzone between the trailing scraper blade and the trough. As the treatment cell rotates around the clarifier container relative to the trough, the fill subzone expands in size and the float zone contracts in size. The treatment cell is not in fluid communication with the influent supply chamber during a dwell period commencing when the leading scraper blade passes the front edge of the trough and ending when said leading scraper blade passes the rear edge of the trough.

Each of the feed ports described above in communication with the fill subzone is at least partially aligned with one of the movable influent inlet ports during the fill period to permit introduction of the liquid influent into the fill subzone during the fill period. Since influent is not introduced directly into the float subzone during the fill period, the mixed liquor or other liquid is substantially quiescent within the float subzone in advance of the trailing scraper blade as it rotates in the direction of rotation. Depending upon the position of a specific treatment cell relative to the troughs, the fill subzone or the float subzone may comprise the entire treatment cell; at other locations during rotation of the treatment cell, the treatment cell may be subdivided into separate fill and float subzones as described above.

BRIEF DESCRIPTION OF DRAWINGS

In drawings which illustrate embodiments of the invention, but which should not be construed as restricting the spirit or scope of the invention in any way.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Invention Overview

This application relates to a circular clarifier 10 for separating and removing separable matter from a liquid medium. The separation may be achieved, for example, by a gas flotation process. Other processes relying on the differential density of the separable matter and the liquid medium may also be employed. The gas flotation or other separation process causes at least a portion of the separable matter to form a layer on the surface of the liquid medium within clarifier 10. As described herein, the separable matter, such as a surface layer of flocculent, is collected and discharged from clarifier 10 for downstream processing or recirculation to an upstream component, such as bioreactor supplying liquid influent to clarifier 10. The liquid influent may comprise suspended solids or other separable matter.

Figure 1:
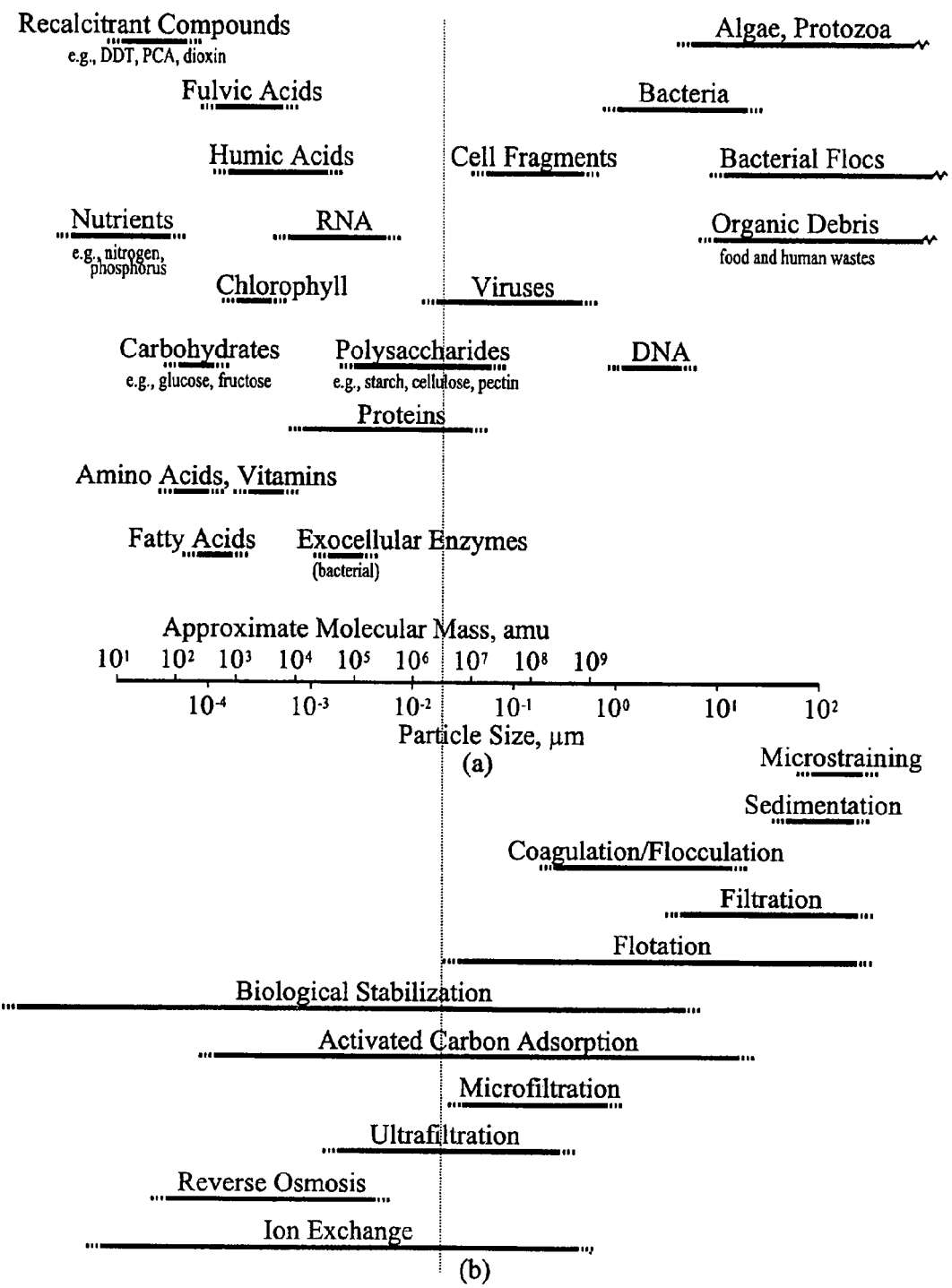
FIG. 1 is a chart comparing treatment technologies for separating wastewater organics of varying particle size and molecular mass.

As used in this patent application "separable matter" means any matter dispersed, suspended or otherwise present in a liquid medium and which is separable from the liquid, such as by gas flotation clarification. The separable matter may include solids, liquids or gases present in the liquid medium in any form whatsoever. For example, the separable matter may comprise suspended solids, colloids and emulsions. The invention is effective in separating and removing separable matter which is not ordinarily removable from the liquid medium by conventional filtration (i.e. non-filterable residue). Suspended solids may include biomass particles such as return activated sludge. By way of further example, the separable matter may include color colloids, macro molecules, surface active solids, liquids and gases, minerals and oil emulsions, such as tar sands pond water. As shown in FIG. 1, flotation separation can potentially remove particulates down to about 0.01 microns in size. The separable matter may also include larger floatable materials, such as offal, hair, feathers and the like (which may be ordinarily filterable by other means).

As used in this patent application "flocculent" means any separable matter concentrated in a surface layer of the liquid medium. For example, the flocculent may comprise a float blanket comprising suspended solid particles which are caused to rise to the surface of the liquid medium by a gas flotation process. Although, the invention is described herein in the context of gas flotation of suspended solids, it should be understood that the invention could be applied for separation and removable of non-solid flocculent, such as liquids or gases, concentrated in a surface layer of the liquid medium.

As used in this patent application "gas flotation" refers to the process of dispersing and/or dissolving a gas in a liquid medium by any means. For example, the process may involve dissolving air, a mixture of gases or a pure gas in the liquid medium. Alternatively, the gas or gases could be produced within the liquid medium by chemical reaction(s). For example, in the case of a process for the removal of phosphorus, flotation may be achieved by acidification of the mixed liquor with alum or ferric chloride. This results in the release of carbon dioxide which is then used for the purposes of flotation. In another example, pure nitrogen gas may be used in refinery applications to separate oil from water.

As should be apparent from the foregoing, the terms "clarifier" and "clarification" as used herein are not restricted to a process for removing solid particles from a liquid. Rather, such terms refer to apparatus and process for removing any separable matter (including non-solid matter) from a liquid medium in accordance with the invention.

Figure 2:
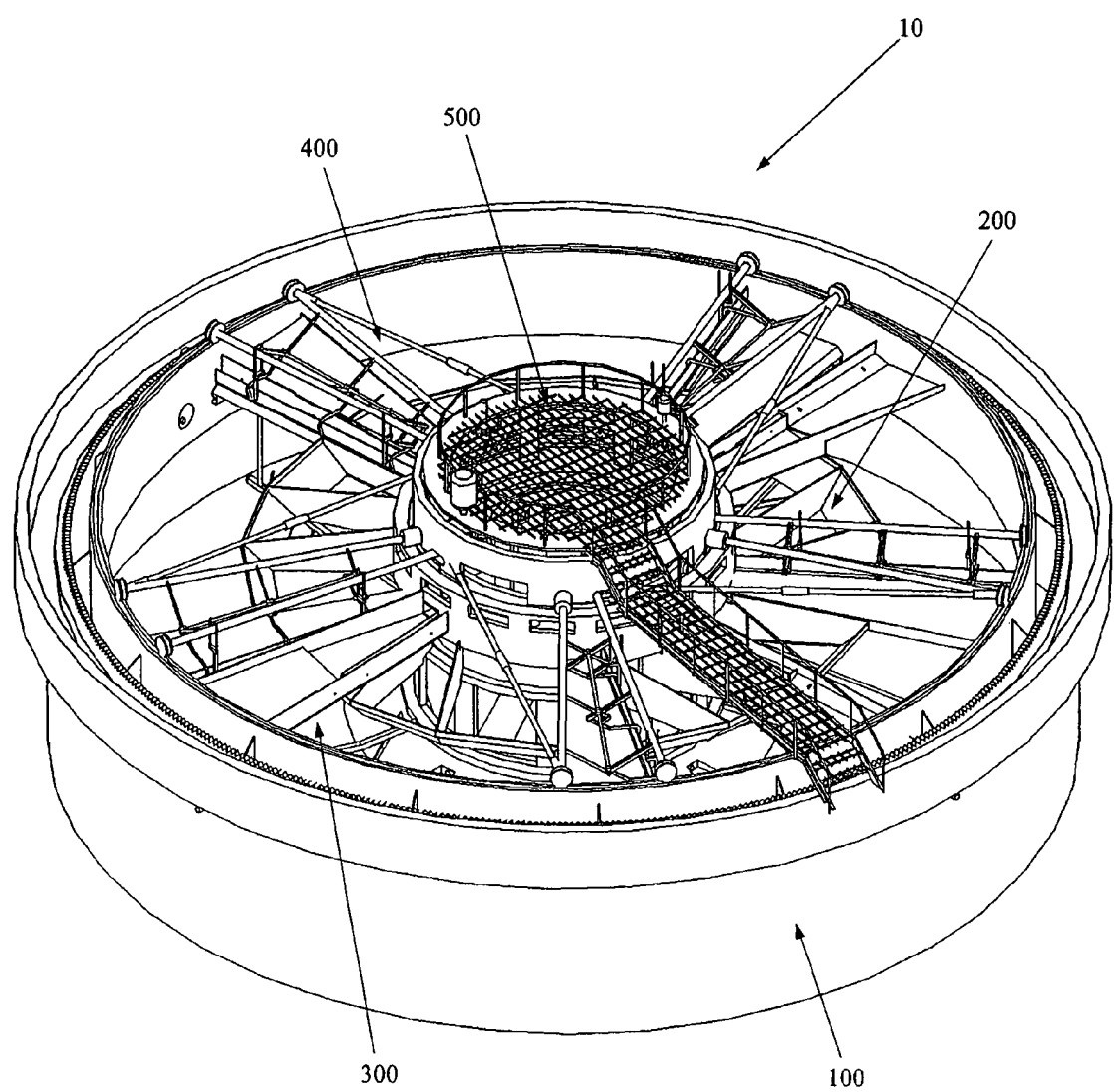
FIG. 2 is an isometric view of the Applicant's circular clarifier in its assembled configuration.
Figure 3:
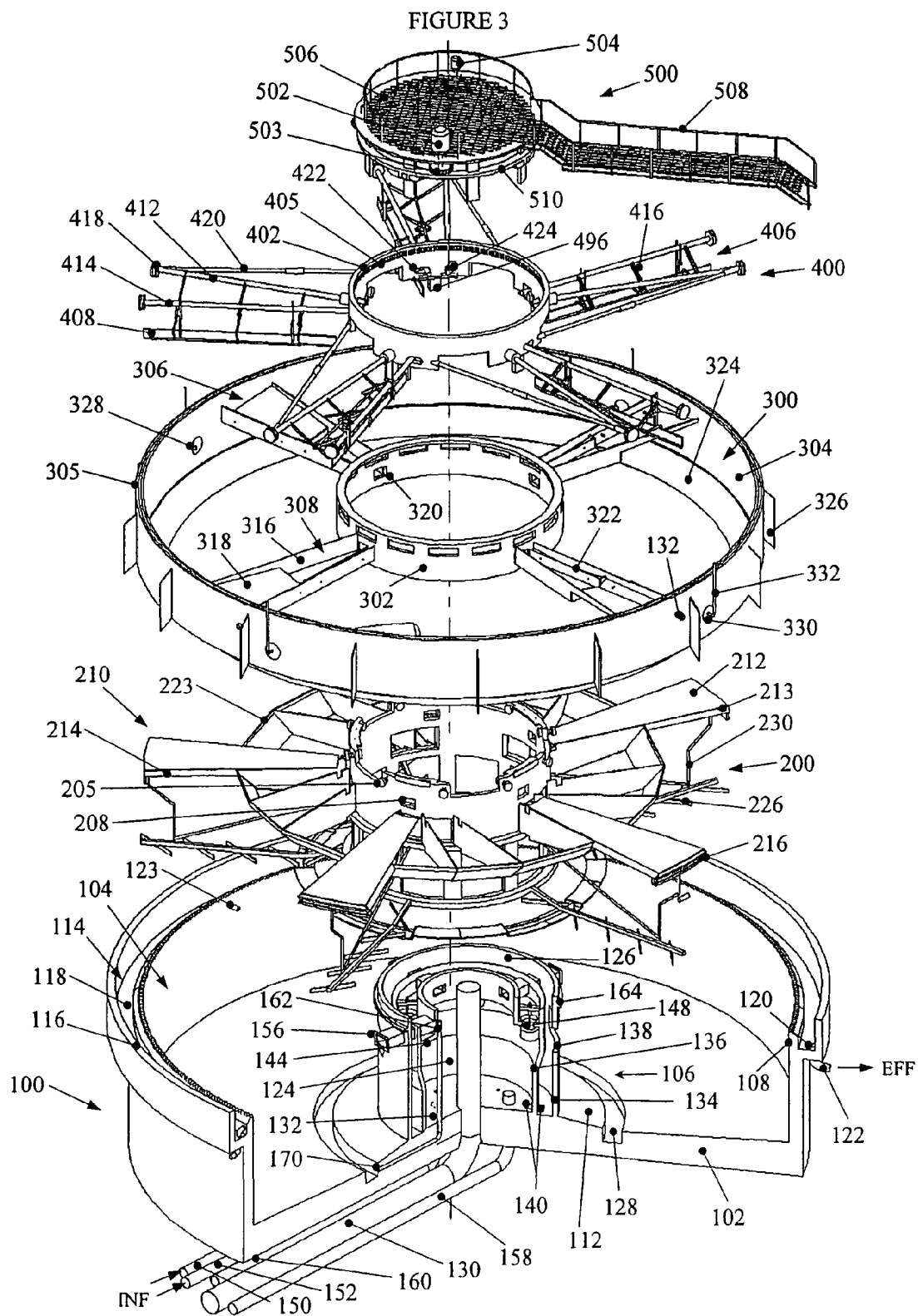
FIG. 3 is an exploded, isometric view of the clarifier of FIG. 2 showing the clarifier subassemblies.

As shown in FIGS. 2 and 3, clarifier 10 of the present invention includes five different subassemblies which are operatively coupled together, namely a clarifier bowl subassembly 100, a lower rotating subassembly 200, a flocculent troughs subassembly 300, an upper rotating subassembly 400 and a scraper drive, cam ring and operator's platform subassembly 500. As described further below, lower and upper subassemblies 200, 400 rotate in unison relative to subassemblies 100, 300 and 500 which remain fixed in place during operation of clarifier 10.

Clarifier Bowl Subassembly

Figure 4:
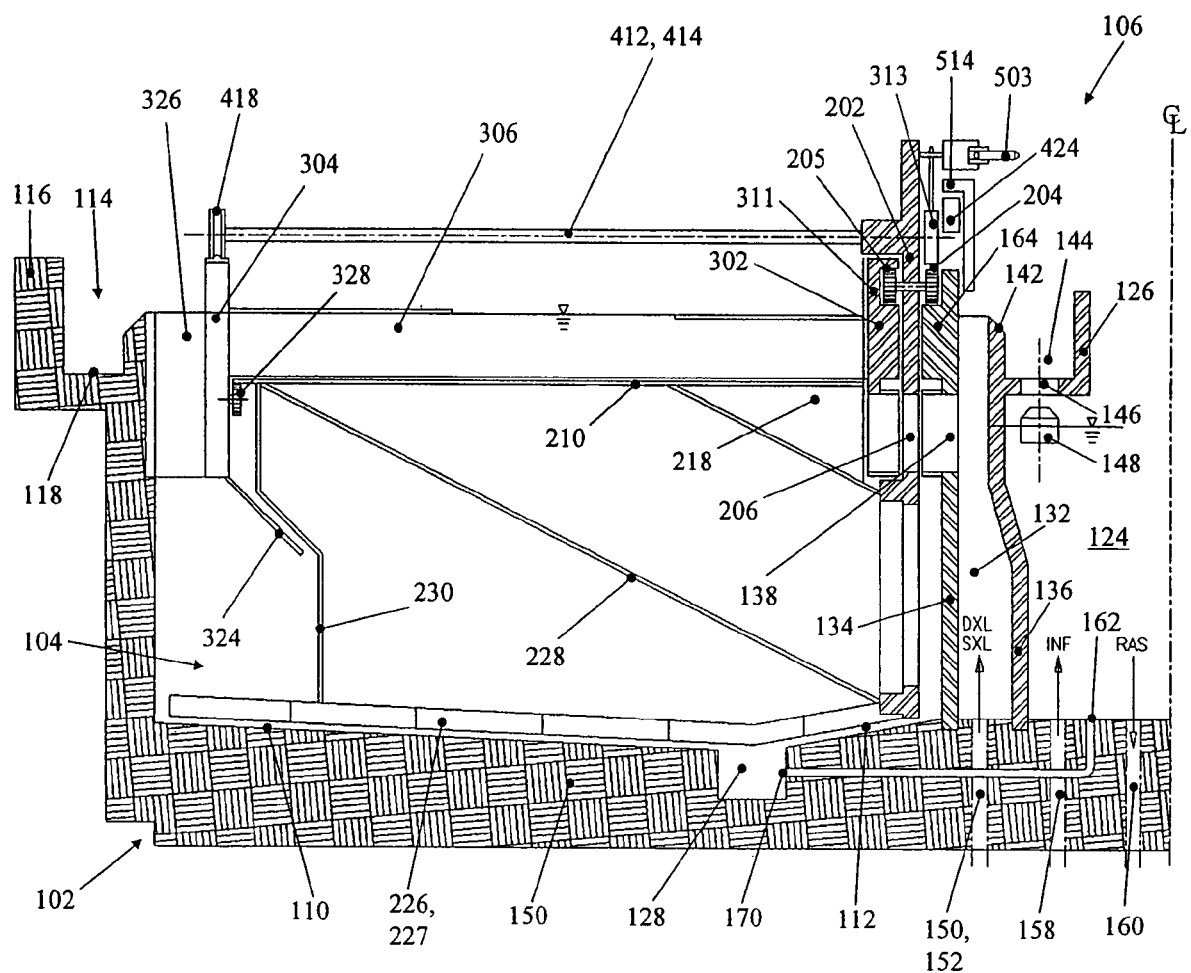
FIG. 4 is a simplified cross-sectional view of a functional model of the clarifier of FIG. 3.
Figure 5:
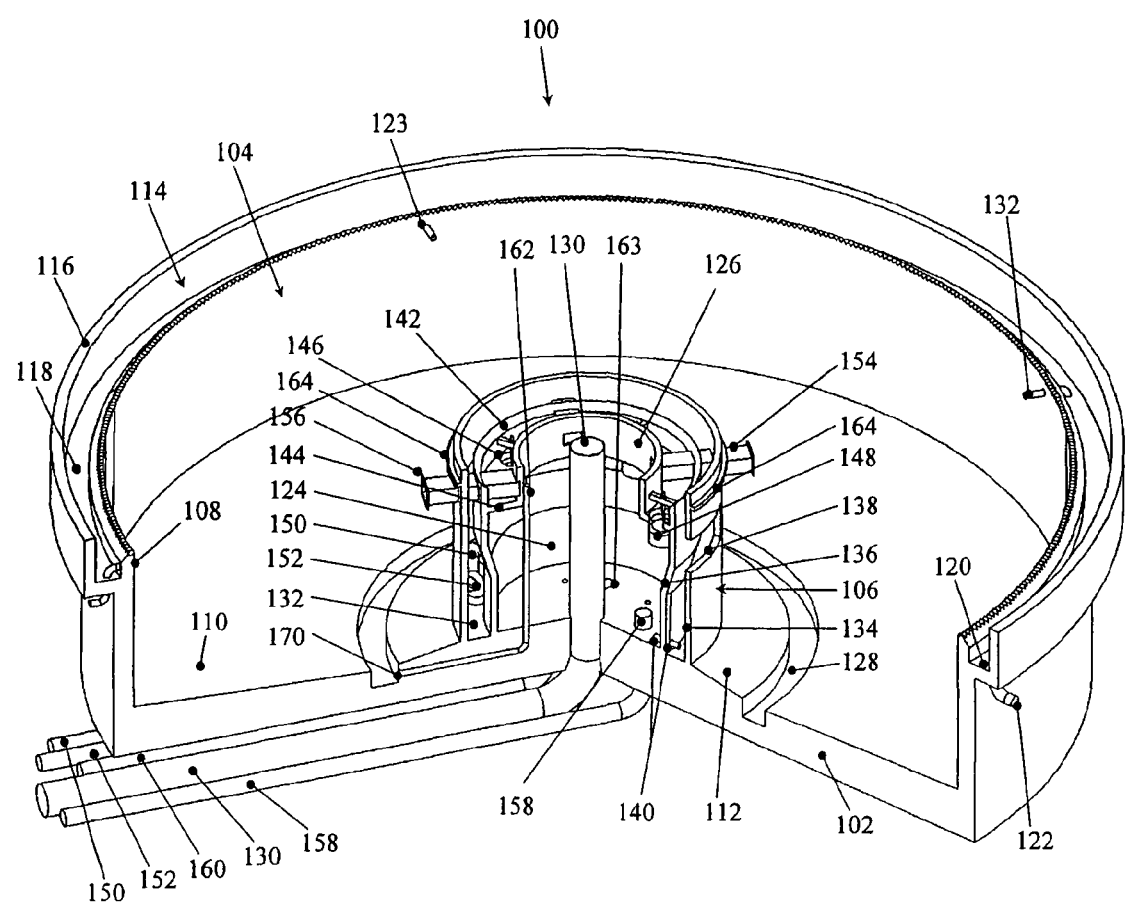
FIG. 5 is an isometric, fragmented view of the clarifier bowl subassembly.

As shown best in FIG. 5, clarifier bowl subassembly 100 includes a clarifier bowl 102. Bowl 102 comprises a cylindrical liquid treatment reservoir 104 defined between a central cylindrical hub 106 and a peripheral wall 108. A floor 110 forms the bottom surface of reservoir 104. A tapered apron 112 may be provided for securing hub 106 to floor 110. This feature is shown in cross-section in FIG. 4 which illustrates a functional model of the invention. Bowl 102 also includes an outer effluent overflow weir 114 defined between peripheral wall 108 and an outermost cylindrical wall 116. Weir 114 has a bottom surface 118 having one or more discharge outlets 120 formed therein for enabling flow of effluent from weir 114 into a discharge conduit 122.

Central hub 106 includes a holding tank 124 defined by an inner cylindrical wall 126, in an upper portion thereof, and an intermediate wall 136 in a lower portion thereof, as shown best in FIG. 8(*b*). One or more sumps 128 are formed in or proximate to apron 112 for collecting settled solids from a bottom portion of reservoir 104 and recycling them into holding tank 124 (FIGS. 4 and 5) as described in further detail below. A conduit 130 extends upwardly within the interior of holding tank 124 to provide access to the upper portion of hub 106 and other interior components of clarifier 10. For example, conduit 130 provides for easy routing of services such as air, cleaning water, polymer, instrumentation cables and the like.

Hub 106 further includes an influent supply chamber 132 defined between an outer wall 134 and intermediate wall 136. A plurality of influent feed ports 138 are formed in outer wall 134 to permit regulated flow of influent from chamber 132 into liquid treatment reservoir 104 as described below. In the illustrated embodiment, influent feed ports 138 are shown as being rectangular. However, in alternative embodiments feed ports 138 could be other shapes or configurations which would have the effect of altering the fluid flow dynamics. A discharge valve 140 is provided in a bottom portion of chamber 132 for purging any solids which settle therein.

An internal recycle overflow weir 142 is located within the interior of hub 106 between an upper portion of holding tank 124 and influent supply chamber 132 (i.e. weir 142 may comprise an upper portion of intermediate wall 136 as shown best in FIG. 8(*b*)). Weir 142 includes a trough 144 having one or more recycle ports 146 formed in a flat bottom portion thereof. One or more float valves 148 are disposed within tank 124 for regulating recycle flow through ports 146 from weir 142 into tank 124 (FIG. 5). Float valves 148 help maintain a head difference between reservoir 104 and holding tank 124 to eliminate the need to pump flocculent into tank 124 as described below.

Clarifier bowl subassembly 100 includes a plurality of conduits for distributing fluid to and from central hub 106. For example, central hub 106 may be in fluid communication with an upstream bioreactor (not shown), such as a hyperbaric vertical shaft bioreactor described in U.S. Pat. No. 5,645,726, the disclosure of which is hereby incorporated herein by reference. In the illustrated embodiment, a deep extraction line 150 originating in a saturation zone near the bottom of the upstream bioreactor and a shallow extraction line 152 originating in the head tank of the upstream bioreactor convey influent into influent supply chamber 132. In this arrangement the deep extraction line 150 supplies influent containing mostly dissolved gas and the shallow extraction line 152 supplies influent containing dispersed gas or micro bubbles. The rate at which the influent is introduced into influent supply chamber 132 may vary depending upon the size of supply lines 150, 152. Preferably influent is introduced into influent supply chamber 132 in a manner sufficient to cause a turbulent flow of influent therein. For example, the outlets of supply lines 150, 152 may be oriented tangentially as shown in FIG. 5 to induce a counter-clockwise flow of influent within chamber 132. The outlet of the deep extraction line 150 may be disposed immediately above the outlet of shallow extraction line 152 to allow the dispersed gas to travel upwardly through the dissolved gas stream. Accordingly, the two influent streams co-mingle in the influent supply chamber 132. As described in Applicant's '726 patent referred to above, the fluid mixture of dispersed gas at atmospheric pressure causes the much greater quantity of dissolved gas, at the higher partial pressure, to come out of solution just prior to its introduction into reservoir 104. This results in a homogenous mixture of bubbles and suspended solids (or other separable matter) within influent supply chamber 132 which is an important requirement for good gas flotation separation. The influent mixture is delivered from chamber 132 through feed ports 138 into reservoir 104 for flotation as described below. The influent may be introduced into reservoir 104 through feed ports 138 so as to induce liquid flow in a direction opposite to the flow direction in influent chamber 132 (e.g. clockwise rather than counterclockwise).

By way of example, influent may be introduced into chamber 132 through supply lines 150, 152 at a rate of approximately 3-6 ft/sec in the case of small clarifiers 10 and approximately 10-15 ft/sec in the case of large clarifiers 10. Depending upon the size of clarifier 10, the horizontal velocity of influent within chamber 132 may be maintained within the range of approximately 1.5 to 2.5 ft/sec, thus substantially preventing settlement of solids. However, any solids which do settle within chamber 132 may be purged through valve 140. In this example the size of feed ports 138 are configured so that an entry velocity into reservoir 104 of 8-10 ft/minute, at average daily flow, is maintained. This ensures proper energy levels for flocculation of the incoming mixed liquor influent. Further, due to the upflow of bubbles liberated when influent passes through feed ports 138 into reservoir 104, a sufficient head loss is created to ensure substantially equal fluid flow within the appropriate treatment regions 600 of clarifier 10 as described below. In this example the residence time in the active volume portion of influent supply chamber 132, namely the volume of chamber 132 above supply lines 150, 152 but below feed ports 138, is less than one minute. This allows sufficient time for large bubbles, which may be disruptive to the formation of the float blanket, to escape from the top of the influent supply chamber 132 and not enter reservoir 104. As will be apparent to a person skilled in the art, this example is for illustrative purposes only and many variations are possible without departing from the invention. For example, although the influent liquid is described herein in the context of a mixed liquor comprising suspended solids, other liquid influent could be introduced into reservoir 104 as described above.

Figure 7A:
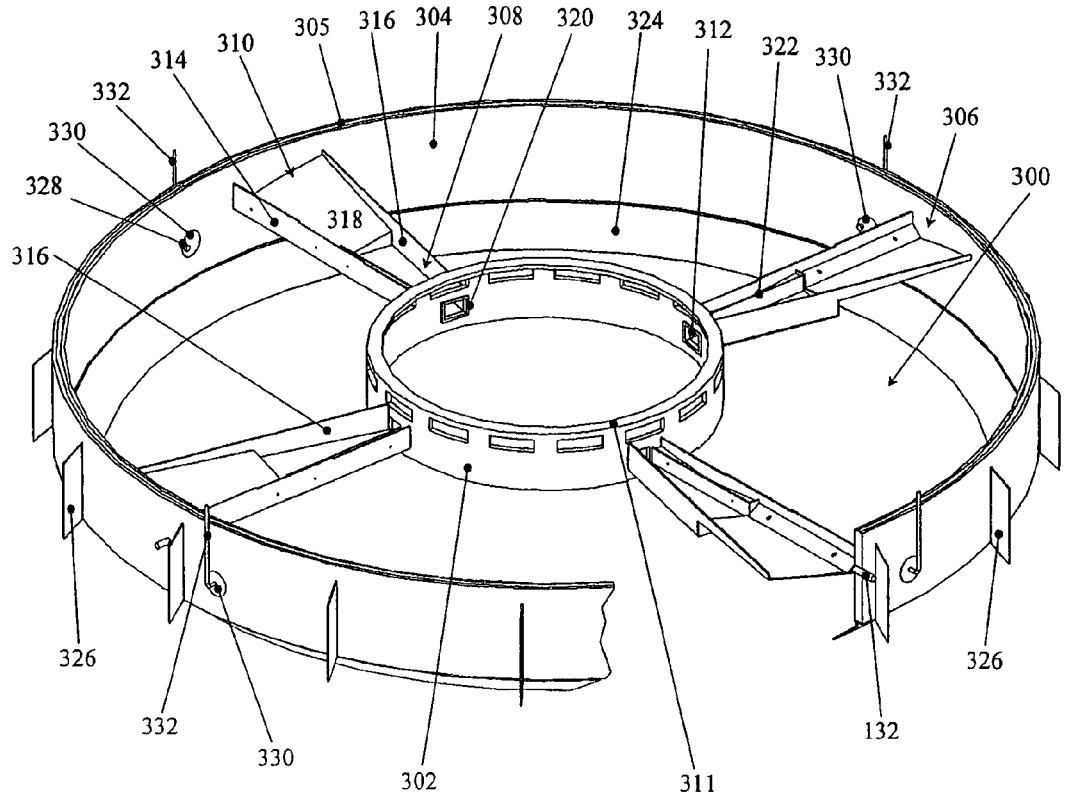
FIG. 7(a) is an isometric, fragmented view of the flocculent troughs subassembly.
Figure 8A:
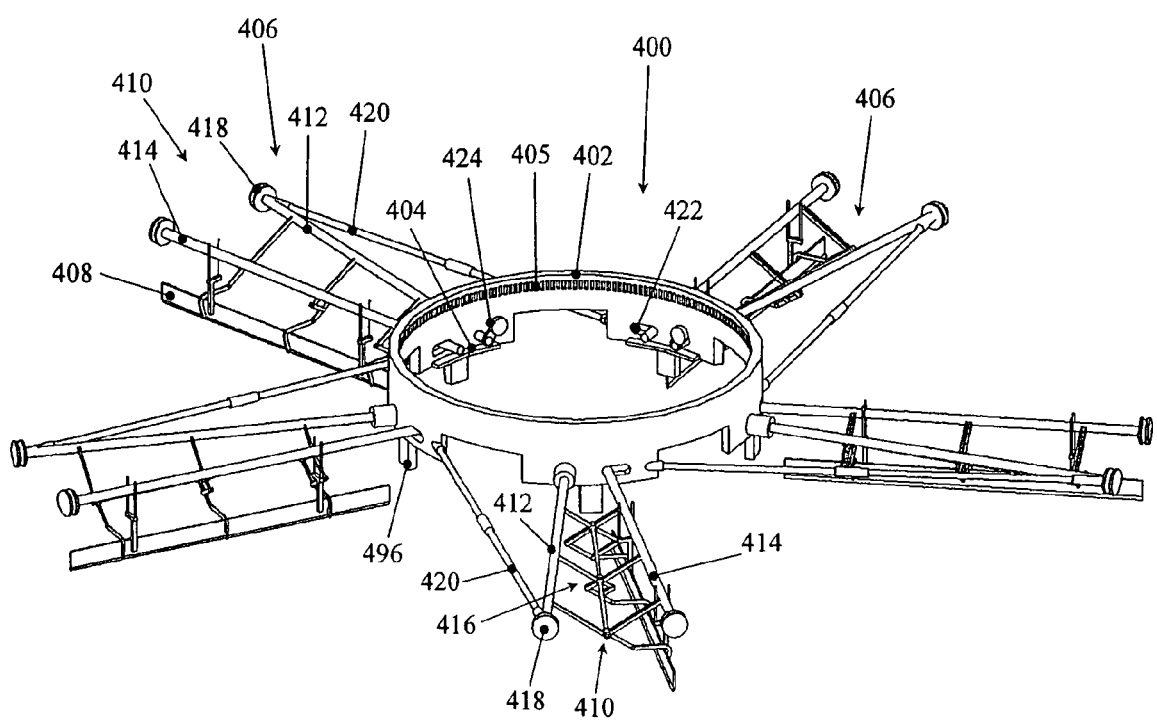
FIG. 8(a) is an isometric view of the upper rotating subassembly.
Figure 8B:
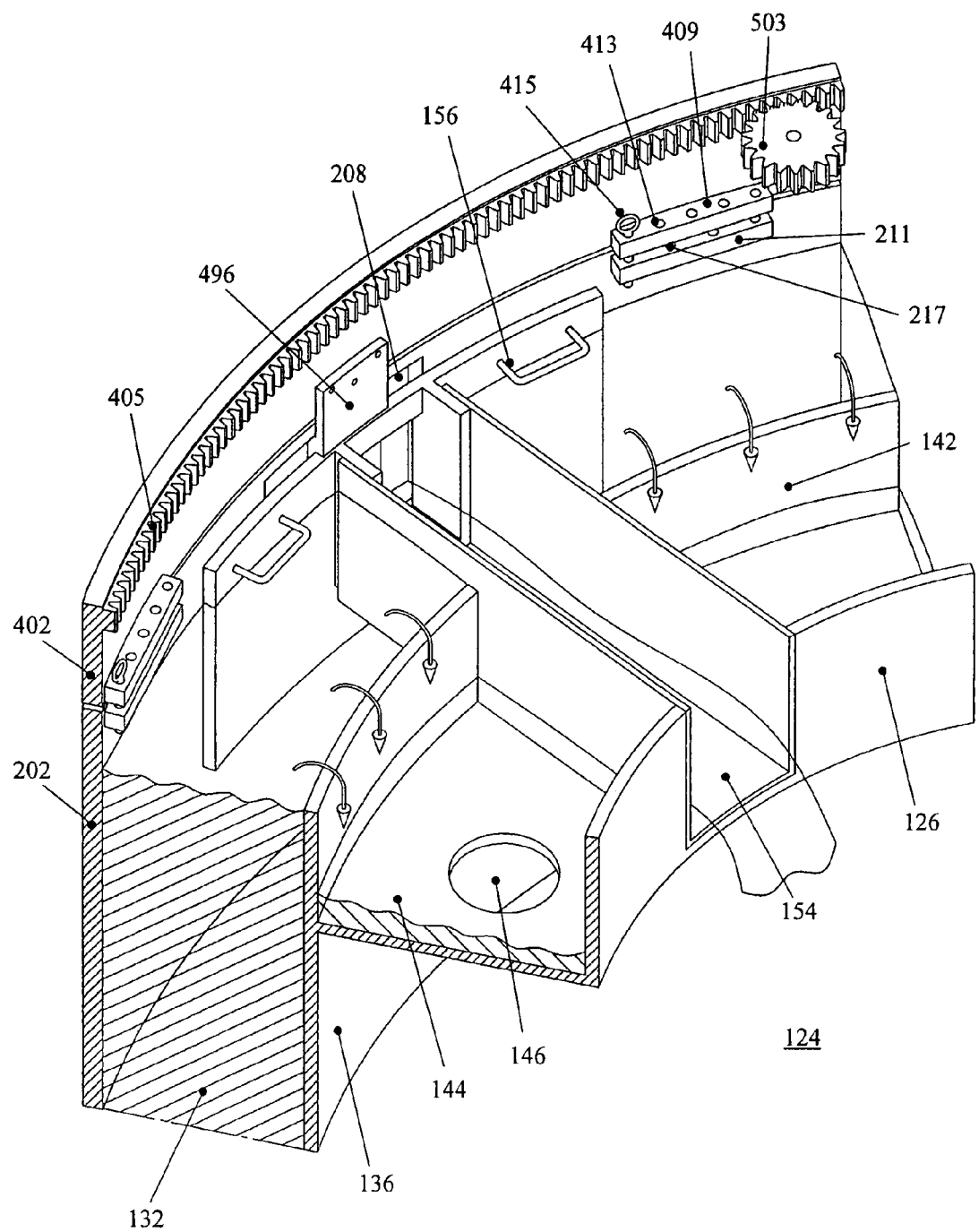
FIG. 8(b) is an enlarged perspective, fragmented view of a portion of the upper rotating subassembly releasably coupled to the lower rotating subassembly.

As shown in FIGS. 5 and 8(b), clarifier bowl subassembly further includes a plurality of spaced-apart, laterally extending flocculent collection conduits 154. As described below, conduits 154 convey flocculent from troughs subassembly 300 (FIG. 7(a)) into holding tank 124 of clarifier bowl subassembly 100. A seal 156 is provided at the outer end of each conduit 154.

Influent is preferably delivered through supply lines 150, 152 into influent supply chamber 132 continuously. In one embodiment of the invention raw influent may also be delivered through a supply line 158 directly into holding tank 124. Further, the contents of holding tank 124 may be recycled to an upstream reactor through a recycle line 160 (FIG. 5).

As described in detail in Applicant's '726 patent referred to above, optimum air flotation performance is achieved when influent is introduced into reservoir 104 at a relatively constant rate and where a minimum delivery time has elapsed between the upstream influent source and reservoir 104. If pressure regulation valves are not used, the rate of gas dissolution is a function of time and is generally linear with distance. For example, the distance between the zone of maximum gas saturation in the upstream reactor to feed ports 138 could be 300 to 400 feet in a small clarifier 10 and 400 to 500 feet in a large clarifier 10.

In order to ensure a relatively constant flow of influent into reservoir 104 under varying operating conditions, an internal recycle stream is provided which is conveyed through recycle line 160. The recycle stream is equal to the difference between the flow volume to the point of delivery through feed ports 138 and the forward flow of effluent through effluent discharge conduits 122. In one embodiment the recycle stream is also equal to the influent or effluent flow plus a waste activated sludge (WAS) component. In other words, the infeed influent flow rate may be equal to the rate of removal of effluent and WAS from clarifier 10 to maintain constant fluid flow within the system. In order to accomplish this, holding tank 124 and treatment reservoir 104 are hydraulically coupled. In particular, when the influent flow rate into holding tank 124 through supply line 158 exceeds the effluent flow rate through discharge conduits 122, the liquid level in holding tank 124 rises which causes closure of ports 146 by float valves 148 (FIGS. 5 and 8(b)). This is turn causes decreased flow over weir 142 and increased flow to effluent discharge conduits 122. Conversely, when influent flow is less than effluent flow, the fluid level in holding tank 124 will decline causing increased flow over weir 142 (FIG. 8(b)) and reduced flow to effluent discharge conduits 122.

By way of example, the maximum internal recycle rate may be set at twice the average daily flow. Influent flows in excess of the twice average daily flow may be accommodated by increasing flow in influent supply line 152 which is controlled by the head tank level in the upstream influent source. The length of the overflow weir 142 may be determined, for example, by an allowable overflow rate of 50,000 gallons/day/linear foot of weir at average daily flow.

Solids settling on the bottom floor 110 of reservoir 104 may be conveyed into holding tank 124 from sumps 128 through standpipes 162 (FIG. 5). Flow may be increased or decreased by adjusting the height of standpipes 162. Standpipes 162 may optionally be fitted with air lifts to clear blockages. As shown best in FIG. 5, each standpipe 162 includes an inlet port 170 in communication with sump 128. In one embodiment, opening and closing of port(s) 170 may be adjustably regulated as described below.

Holding tank 124 therefore contains a mixture of fluids and solids from various sources. In particular, conduits 154 intermittently convey flocculent into tank 124; conduit 158 conveys raw influent into tank 124; ports 146 and valves 148 regulate the flow of the internal recycle stream into tank 124 from weir 142; and sumps 128 and standpipes 162 convey bottom recycle into tank 124 as described above. The resulting mixture is discharged from a bottom discharge port 163 of tank 124 into mixed flow recycle line 160.

A narrow track 164 is formed on an upper outer surface of wall 134 and extends peripherally around central hub 106 (FIG. 5). As described further below, track is provided for rotatably coupling the lower rotating subassembly 200 to the stationary clarifier bowl subassembly 100.

Lower Rotating Subassembly

Figure 6:
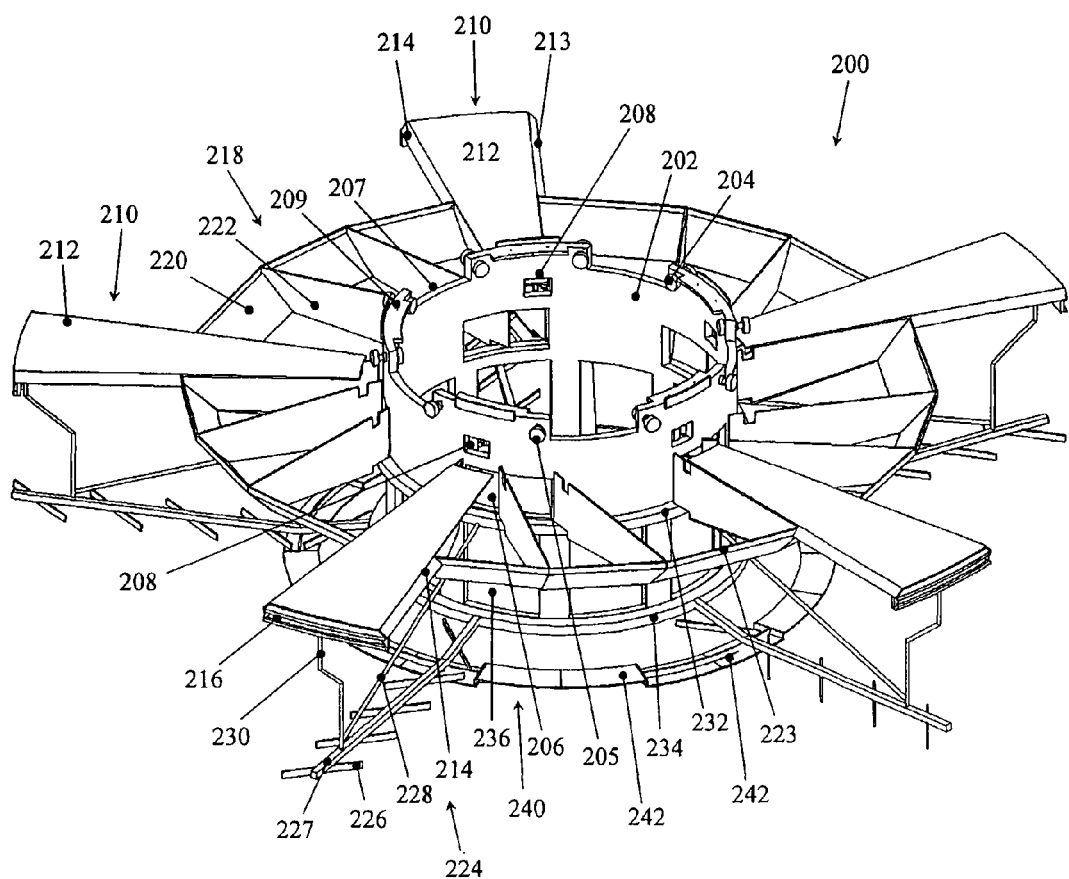
FIG. 6 is an isometric view of the lower rotating subassembly.

FIG. 6 illustrates the lower rotating subassembly 200 in detail. Subassembly 200 is rotatable relative to subassembly 100. Subassembly 200 includes a cylindrical support cylinder 202. In the illustrated embodiment, a plurality of rollers 204 extend inwardly from an upper portion of cylinder 202 at spaced intervals. Rollers 204 travel on track 164 extending peripherally on wall 134 around central hub 106 of clarifier bowl 102 thus enabling cylinder 202 to rotate relative to hub 106 (FIG. 2). As described further below, rotation of cylinder 202 may be driven by a drive means disposed above subassembly 200 and mechanically coupled thereto.

Subassembly 200 also includes a plurality of spaced-apart rollers 205 extending outwardly from an upper portion of cylinder 202 for rotatably coupling subassembly 200 to trough subassembly 300. A plurality of cut-outs 207 may be formed in an upper edge of cylinder 202 to enable servicing of rollers 204, 205. In one embodiment, the upper edge of cylinder 202 also includes upwardly projecting plate sections 209 located in regions between cut-outs 207 for aligning lower rotating subassembly with upper rotating subassembly 400. An alternative means for adjustably coupling lower rotating subassembly 200 to upper rotating subassembly 400 is shown in FIG. 8(*b*).

Cylinder 202 includes a plurality of spaced-apart influent inlet ports 206 formed therein. As cylinder 202 rotates relative to hub 106, inlet ports 206 are periodically brought into alignment with feed ports 138 formed on hub 106, as described in detail below. Movable inlet ports 206 thus regulate flow of liquid from influent supply chamber 132 into liquid treatment reservoir 104. As is the case with feed ports 138, the size and shape of inlet ports 206 may vary depending upon the desired fluid flow dynamics.

Cylinder 202 also includes a plurality of spaced-apart flocculent outlet ports 208. In the illustrated embodiment, each flocculent outlet port 208 is positioned directly above an influent inlet port 206 although other configurations are possible. As cylinder 202 rotates relative to hub 106, movable flocculent outlet ports 208 are periodically brought into alignment with flocculent discharge ports 312 formed in trough subassembly 300 (as described below) and flocculent collection conduits 154 (FIG. 5) This permits discharge of flocculent collected in a trough 306 through aligned ports 208, 312 into holding tank 124. The size and shape of ports 208, 312 may vary without departing from the invention.

A plurality of horizontally extending beaches 210 are cantilevered off cylinder 202. Each beach 210 includes an upper surface 212 a chamfered leading edge 213 and a chamfered trailing edge 214. A channel track 216 is located at the outer end of each beach 210. Track 216 engages rollers 328 of subassembly 300 as described below to guide beach 210 under troughs 306. As used in the patent application, the term "leading" refers to the portion of beach 210 which leads in the direction of rotation and "trailing" refers to the portion of beach 210 which trails in the direction of rotation. In use, chamfered leading and trailing edges 213, 214 provide an air pocket under beach 210. Such air pockets reduce the effective dead weight of beach 210 and related support structures and prevent sludge from sticking to the bottom surface of beach 210. As described further below, since dissolved air is typically coming out of solution in reservoir 104, there is a small flow of air constantly being emitted from under each beach 210.

A plurality of baffle assemblies 218 are also cantilevered off cylinder 202. Each baffle assembly is located between a pair of the beaches 210 and includes canted mid-radius baffles 220 and outwardly extending skewed baffles 222. Skewed baffles 222 extend between cylinder 202 and mid-radius baffles 220. Baffles 220, 222 direct the flow of liquid entering reservoir 104 through ports 138 as described below.

A plurality of rake assemblies 224 are also cantilevered off cylinder 202. Each rake assembly 224 is located below a corresponding beach 210 and includes rake plows 226 which move through a bottom portion of reservoir 104 as cylinder 202 rotates around hub 106. As described below, rakes plows 226 move solids which settle on the bottom floor 110 of reservoir 104 toward sumps 128 formed in apron 112 (FIG. 5). In the illustrated embodiment, the rake plows 226 of each rake assembly 224 are mounted on a rake 227. Rake 227 is supported below a corresponding beach 210 by a first support arm 228 connected to cylinder 202 and a second support arm 230 connected to an outer end of beach 210.

In order to provide enhanced structural support, cylinder 202 may include an upper stiffening ring 232 extending around the periphery of cylinder 202 immediately beneath feed ports 206 and a lower stiffening ring 234 supporting rake arm 227. A plurality of portals 236 may be formed in cylinder 202 between stiffening rings 232, 234 to lighten the weight of cylinder 202. Portals 236 also reduce the risk of sludge build-up between cylinder 202 and central hub 106.

As will be appreciated by a person skilled in the art, in alternative embodiments of the invention cylinder 202 could be subdivided into multiple annular portions or rings which are operatively coupled together. For example, movable influent inlet ports 206 could be formed in a first ring and movable flocculent outlet ports 208 could be formed on a second ring disposed above the first ring. The first and second rings could be coupled together to rotate in unison.

As shown best in FIG. 6, lower rotating subassembly 200 may also include a lower peripheral shutter ring 240 comprising a plurality of elongated shutters 242 of varying height. Shutter ring 240 rotates in unison with lower rotating cylinder 202. As described below, this causes shutters 242 to alternatively close and open standpipe inlet ports 170 in one embodiment of the invention. Thus the amount and timing of bottom solids materials recycled back to holding tank 124 may be regulated.

Troughs Subassembly

Figure 11:
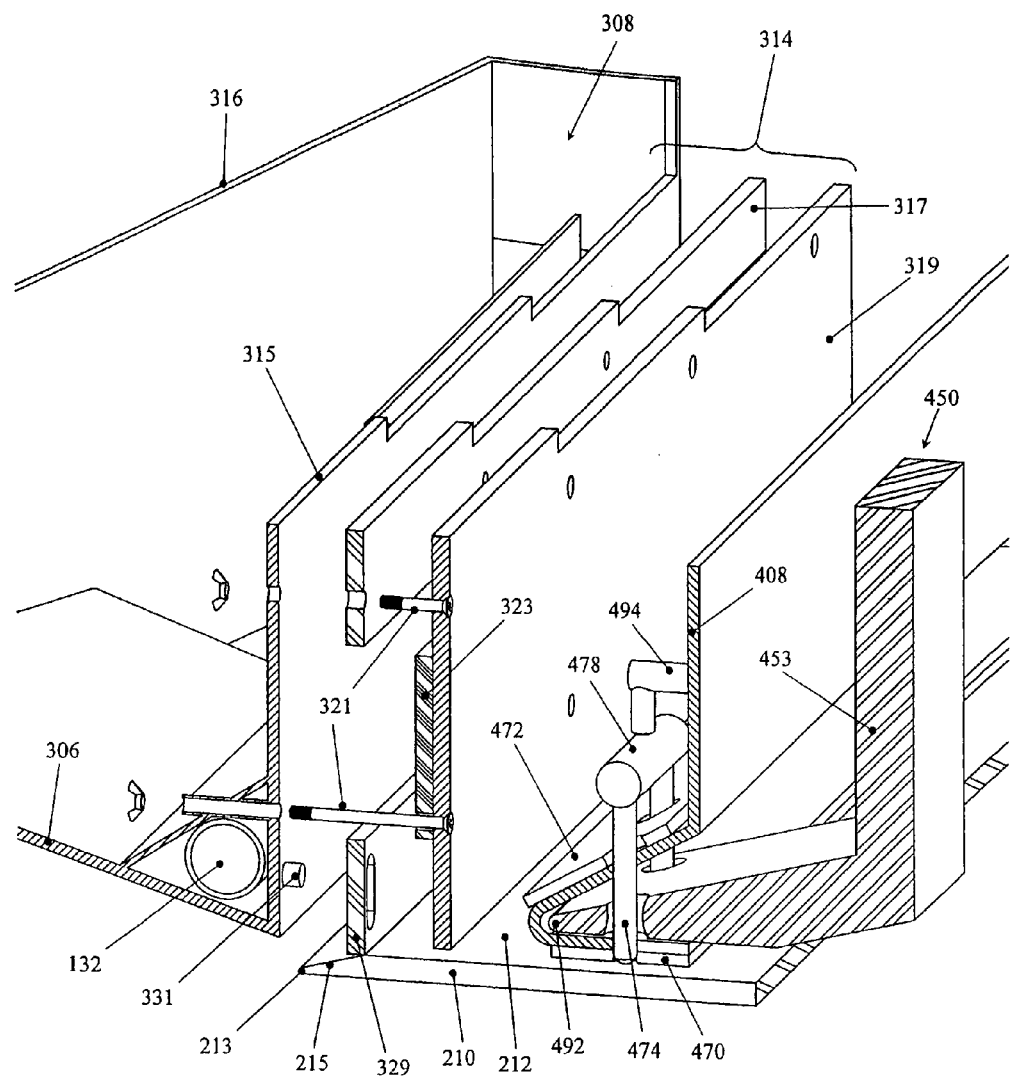
FIG. 11 is an enlarged sectional view of the scraper subassembly of FIG. 10 engaging the front edge of a flocculent collection trough.

FIGS. 7(*a*)-7(*c*) illustrates troughs subassembly 300 in detail. Subassembly 300 includes an inner baffle 302 which is positionable overlying hub 106 and an outer baffle 304 which is disposed proximate to peripheral wall 108 of clarifier bowl 102 (FIG. 2). As described below, inner baffle is supported on hub 106 via rollers 205. Outer baffle 304 has a track 305 formed on its upper surface. A plurality of spaced-apart flocculent collection troughs 306 extend radially between baffles 302, 304. Each trough 306 has a relatively narrow inner end 308 and a wider outer end 310 and may have the shape of a segment of a circle. A plurality of flocculent discharge ports 312 are formed in inner baffle 302 proximate an inner end 308 of a respective trough 306. In the illustrated embodiment, each trough 306 has a front edge 314, a rear edge 316 and a bottom surface 318 inclined downwardly from outer end 310 toward inner end 308 to facilitate passage of a return activated sludge (RAS) component of flocculent (for example) through discharge ports 312. As used in this patent application, "front edge 314" refers to the edge of a selected trough 306 that upper rotating assembly 400 first traverses as it rotates around hub 106 (for example, in a clockwise direction) and "rear edge 316" refers to the edge of the selected trough 306 which upper rotating assembly 400 traverses after it has traversed over the width of trough 306. As shown in FIG. 11 and described below, front edge 314 may be a composite structure comprising, for example, an assembly of seals, spacers and support surfaces.

Figure 7B:
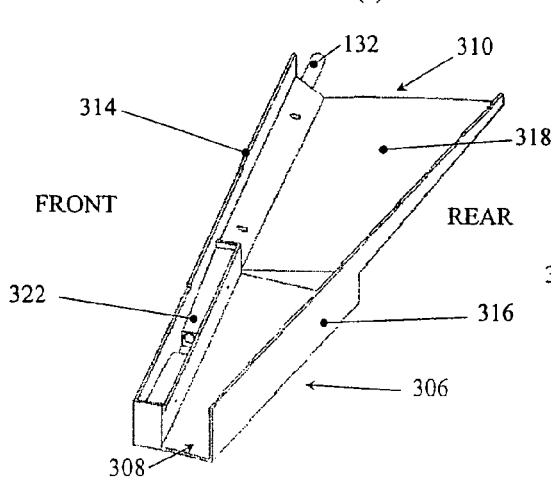
FIG. 7(b) is a first isometric view of a flocculent collection trough.
Figure 7C:
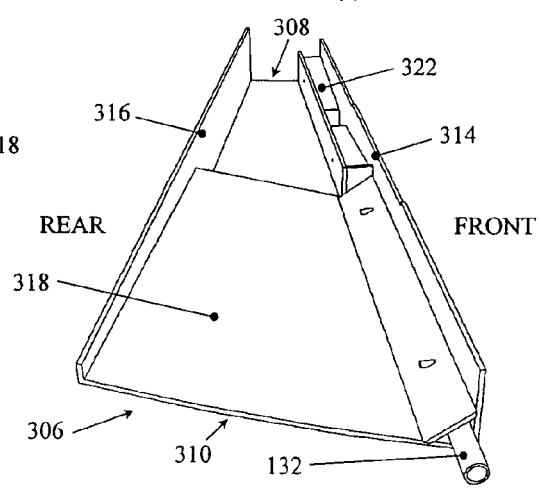
FIG. 7(c) is a second isometric view of a flocculent collection trough.

Each discharge port 312 has a stationary seal 320 formed on its inner surface as shown in FIG. 7(a). As best shown in FIGS. 7(b) and 7(c), a waste activated sludge (WAS) hopper 322 is located within trough 306 for collecting WAS. As described below, the WAS is discharged into WAS discharge lines 132 rather than through discharge ports 312.

Subassembly 300 is coupled to subassembly 100 in a fixed position (and is therefore not rotatable relative thereto). Inner baffle 302 includes an upper rim 311 which serves as a track for receiving rollers 205, thus permitting lower rotating subassembly 200 to rotate relative to both subassemblies 100 and 300 (FIG. 6). As subassembly 200 rotates, movable flocculent outlet ports 208 are periodically brought into alignment with flocculent discharge ports 312 to permit flow of RAS or other flocculent therethrough into flocculent collection conduits 154 (FIG. 5). Conduits 154 empty into holding tank 124 as described above. As cylinder 202 rotates, it passes between seal 320 located on the inner surface of flocculent discharge port 312 and seal 156 on the outer surface of a corresponding flocculent collection conduit 154. Seals 320, 156 compensate for any out-of-roundness of rotating cylinder 202.

In one embodiment seals 320, 156 may be asymmetrical about their centerline. Accordingly, when seals 320, 156 are manually inverted the effect is to change the flocculent discharge timing. Other means for adjusting the timing of flocculent discharge ports 312 are described below and illustrated in FIGS. 8(b) and 8(c).

As shown in FIG. 7, subassembly 300 may also optionally include a conical skirt 324 extending inwardly from outer baffle 304 below troughs 306. Skirt 324 is used when very high quality effluent is required. In this event, support arm 230 (FIG. 6) may function as a plow to remove any solids which may accumulate on conical skirt 324.

Outer baffle 304 may include a plurality of vertical vanes 326 to provide structural support as shown in FIG. 7. One or more adjustable rollers 328 may be provided on outer baffle 304 for adjusting the elevation of beach 210. In particular, each roller 328 engages beach track 216 to adjust the elevation of beach 210 and ensure that a wiper 329 (shown in FIG. 11 and described below) functions properly. Each roller 328 is mounted eccentrically on a plug 330 formed in outer baffle 304. The plug may be rotated with a handle 332, thereby adjusting the elevation of roller 328. Plugs 330 are removable from outside outer baffle 304 for servicing.

Upper Rotating Subassembly

Figure 8C:
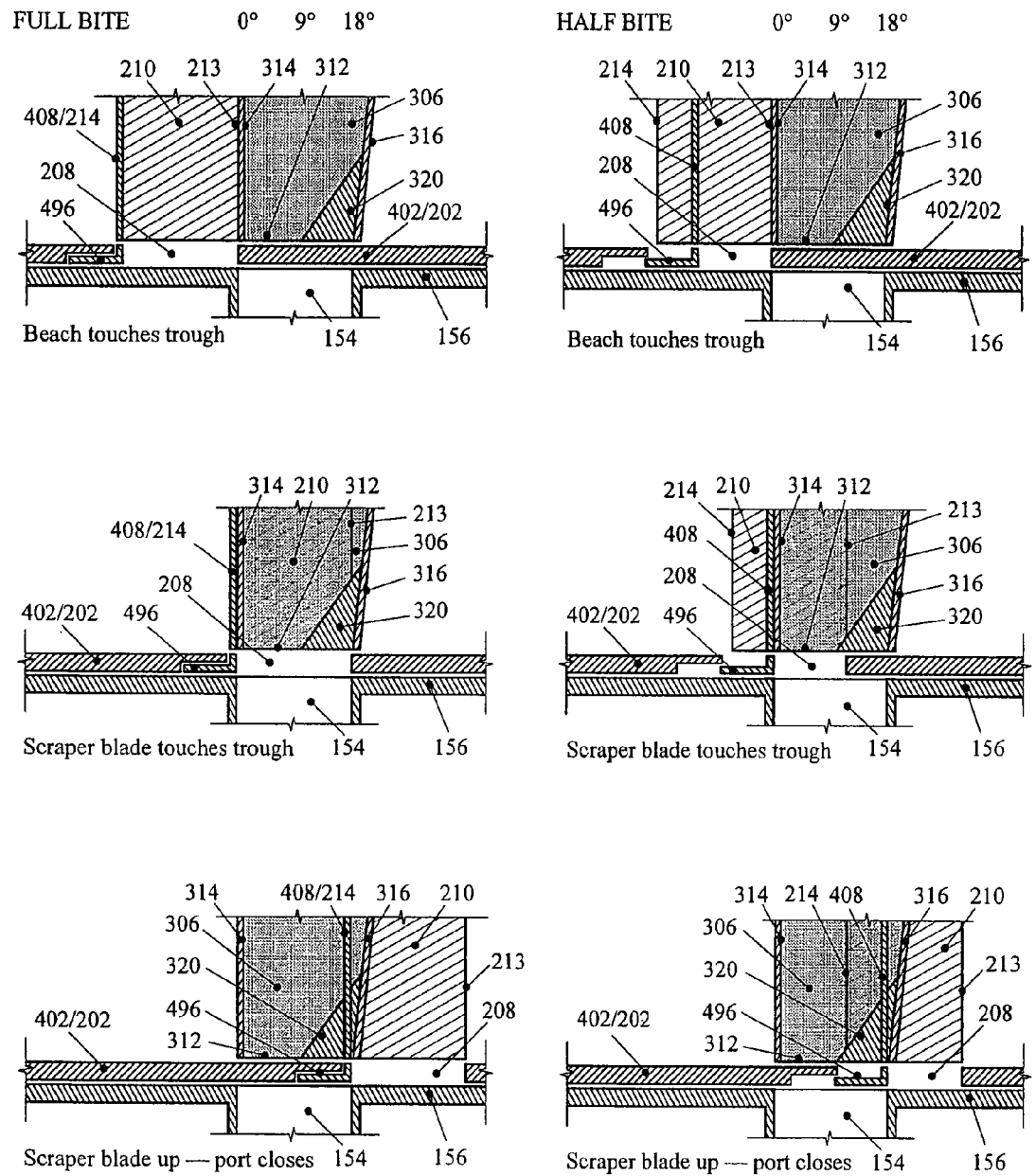
FIG. 8(c) is a series of schematic plan views showing a shutter for automatically adjusting the flocculent discharge port timing sequence depending upon the selected position of the scraper blade position relative to the beach.

FIGS. 8(a)-8(c) illustrates upper rotating subassembly 400 in detail. Subassembly 400 includes a support cylinder 402 which is coupled to cylinder 202 (FIG. 2) and is rotatable therewith. As will be appreciated by a person skilled in the art, various means for operatively coupling cylinders 202, 402 together so that they rotate in unison may be envisaged. One particular embodiment is illustrated in FIG. 8(b) and is described below. In another embodiment, cylinders 202 and 402 may alternatively comprise sections of an integral torque tube rather than separate subassemblies.

Figure 9:
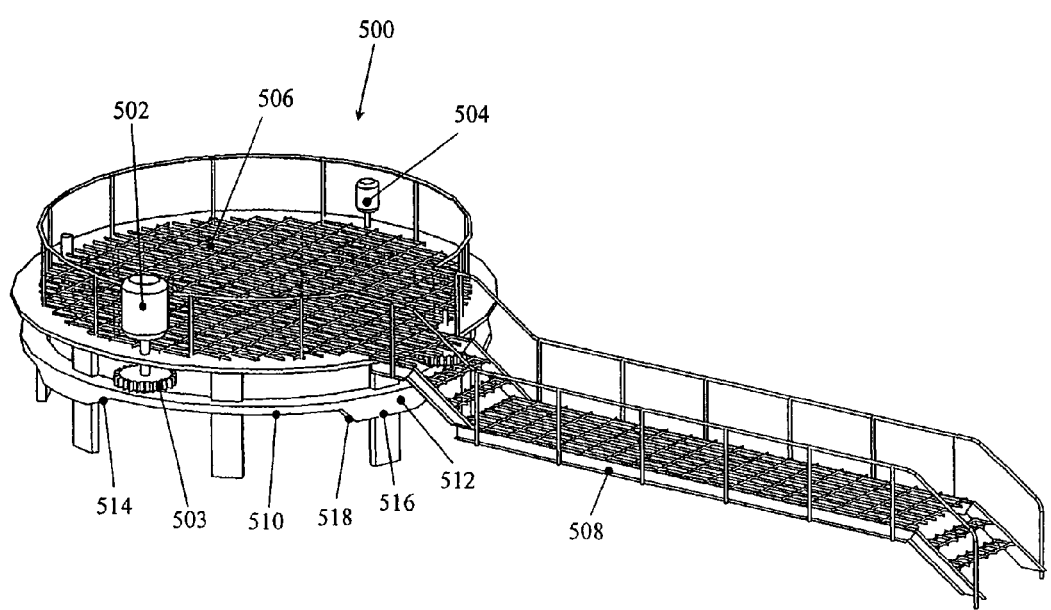
FIG. 9 is an isometric view of the scrapers drive, cam ring and operator's platform subassembly.

A ring gear 405 is located on the inner circumferential surface of support cylinder 402 for driving rotation of cylinder 402 (and cylinder 202 which is coupled thereto). As described in detail below, ring gear 402 is coupled to a sprocket 503 driven by gear motors 502 and/or 504 (FIG. 9).

Support cylinder 402 supports rotation movement of a plurality of scraper assemblies 406. Each scraper assembly 406 includes a radially extending scraper blade 408 and a scraper blade support and lifting mechanism 410 for supporting and lifting blade 408 above a corresponding beach 210 (FIGS. 8(a) and 10). As described in detail below, support mechanism 410 is designed to lift blade 408 when assembly 406 traverses past the front edge 314 of a trough 306 and to lower blade 408 when it traverses past the rear edge 316 of a trough 306 as assembly 406 rotates within clarifier bowl 102. In one embodiment support mechanism 410 comprises a leading support arm 412 and a trailing support arm 414 which extend radially in a support plane above the plane of rotation of scraper blade 408. As used in the patent application, the term "leading" refers to support arm 412 which leads in the direction of rotation and "trailing" refers to the support arm 414 which trails in the direction of rotation. Scraper blade 408 is connected to support arms 412, 414 by a linkage 416. Rollers 418 are mounted on the outer ends of support arms 412, 414 for travel over the upper edge 305 of outer baffle 304 (FIGS. 2 and 7). An adjustable length tie bar 420 extends between support cylinder 402 and the outer end of leading support arm 412 to provide additional structural support (FIG. 8(a)).

The inner end of trailing support arm 414 is slidable coupled to support cylinder 402. In particular, each trailing support arm 414 is movable within a corresponding slot 422 formed in support cylinder 402 to enable adjustment of the angular distance support arms 412, 414 as described below. A roller rocker wheel 424 is mounted on the inner end of each leading support arm 412 within the interior of support cylinder 402 (FIG. 8(a)). As described below, wheel 424 traverses a scraper lifting mechanism actuating cam 512 to actuate adjustment of the angular distance between support arms 412 and 414 (FIG. 10) and hence vertical displacement of scraper blade 408 in the vicinity of a trough 306.

Details of Scraper Blade Lift Mechanism

FIGS. 10-14 illustrate scraper blade support and lift mechanism 410 in further detail. Mechanism 410 mechanically converts rotational movement of support cylinder 402 to vertical displacement of support blade 408 in the vicinity of troughs 306 as described below. Rotating movement of scraper blade 408 along a radial axis is temporarily discontinued during the period blade 408 is raised and lowered. Due to the relative spacing of troughs 306 and scraper assemblies 406, in the illustrated embodiment of the invention only one blade 408 is vertically displaced at any selected time while the other blades 408 continue to rotate in a common plane of rotation at a constant velocity (all of the scraper assemblies 406 are preferably driven by a common drive). Linkage 416 connecting support arms 412, 414 to blade 408 is configured to achieve these purposes. As shown best in FIG. 10, linkage 416 includes a plurality of V-shaped first linkage elements 426 extending between first and second support arms 412, 414. Each element 426 includes a first segment 428 connected to leading support arm 412 and a second segment 430 connected to trailing support arm 414. Linkage segments 428, 430 are joined by first connectors 432. Optionally, first connectors 432 may be connected together along a stabilizer shaft 434.

Figure 10:
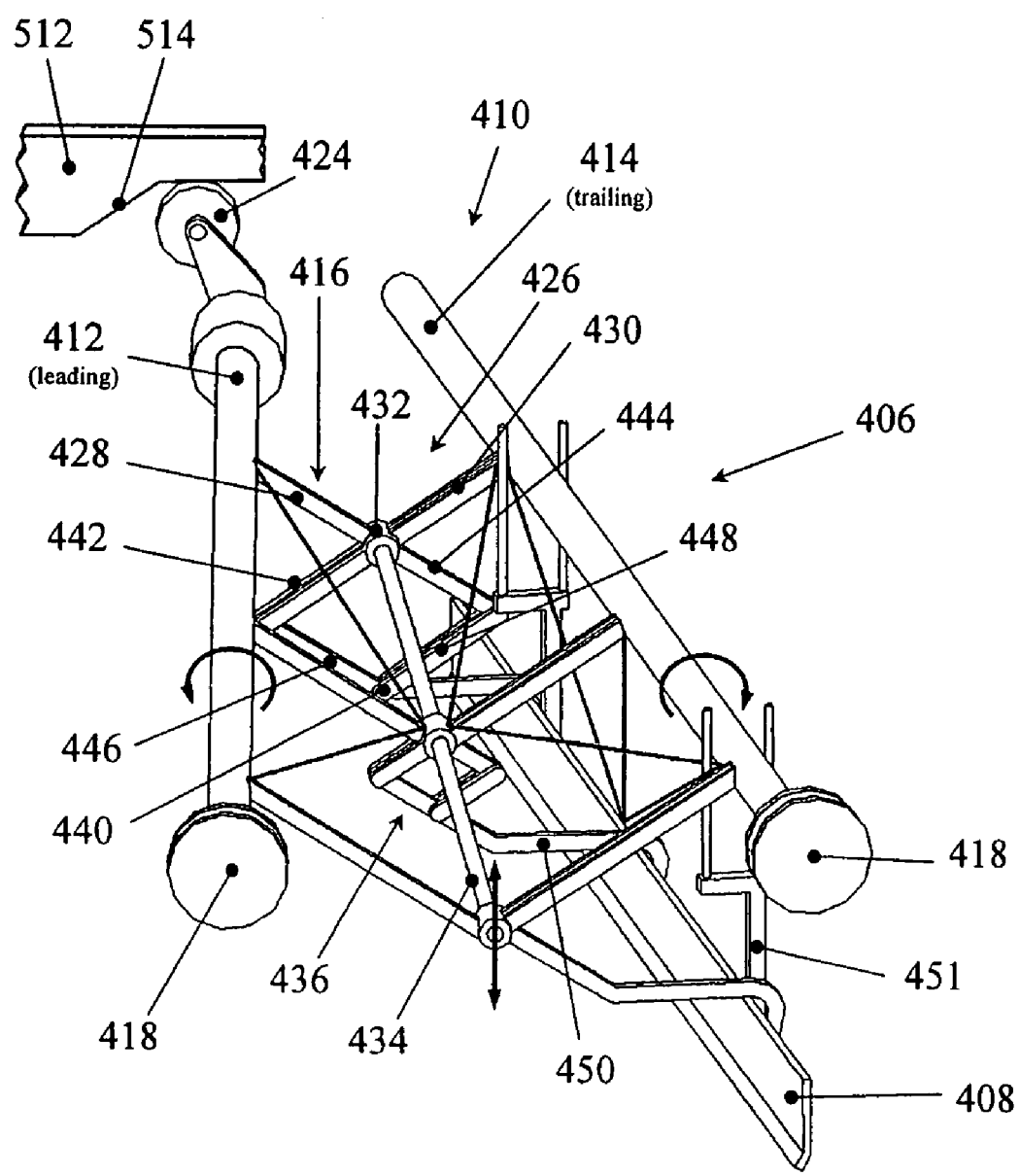
FIG. 10 is an enlarged, isometric view of the scraper subassembly.
Figure 12:
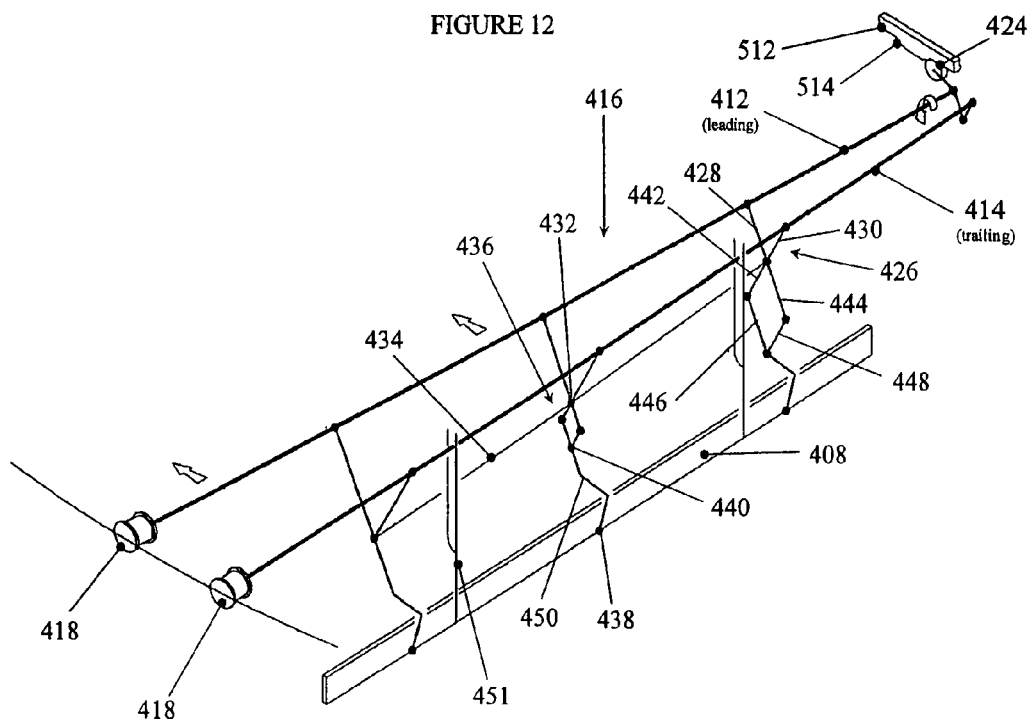
FIG. 12 is a simplified isometric view of the scraper subassembly showing the scraper blade in a lowered position.
Figure 13:
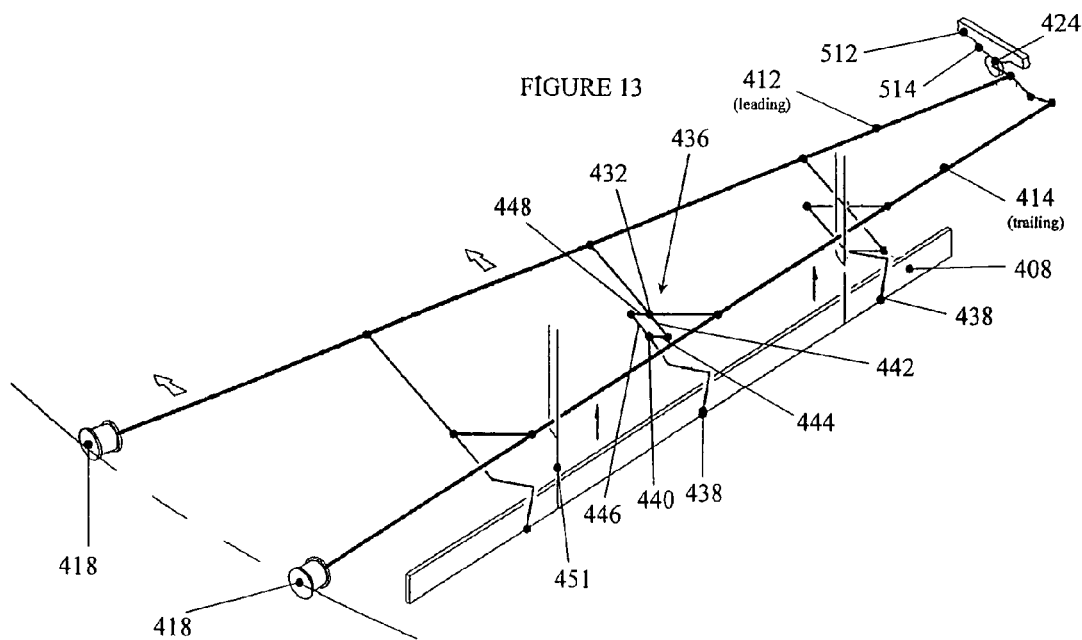
FIG. 13 is a simplified isometric view of the scraper subassembly of FIG. 12 showing the scraper blade adjusted to a raised position.

Linkage 416 further includes a plurality of second linkage elements 436 for coupling first connectors 432 to second connectors 438 which are located on blade 408 at spaced-apart locations (FIGS. 12 and 13). At least some of the second linkage elements 436 disposed toward the inner end of support arms 412, 414 (and toward the outer end of arms 412, 414 in the case of the embodiment of FIG. 14(e)) further include third connectors 440 located between first and second connectors 432, 438. In this case, second linkage elements 436 include third, fourth, fifth and sixth segments 442, 444, 446 and 448 which together define a rhombic shape for linking first and third connectors 432, 440 together. Further, a seventh segment 450 may be provided for linking the second and third connectors 438, 440 together. Linkage 416 may further include a stabilizer link 451 for supporting blade 408 relative to trailing support arm 414 (FIG. 10). In one embodiment, best shown in the enlarged scale of FIG. 11, segment 450 may include a lower portion 453 for coupling segment 450 to a tapered bottom portion of scraper blade 408.

Figure 14A:
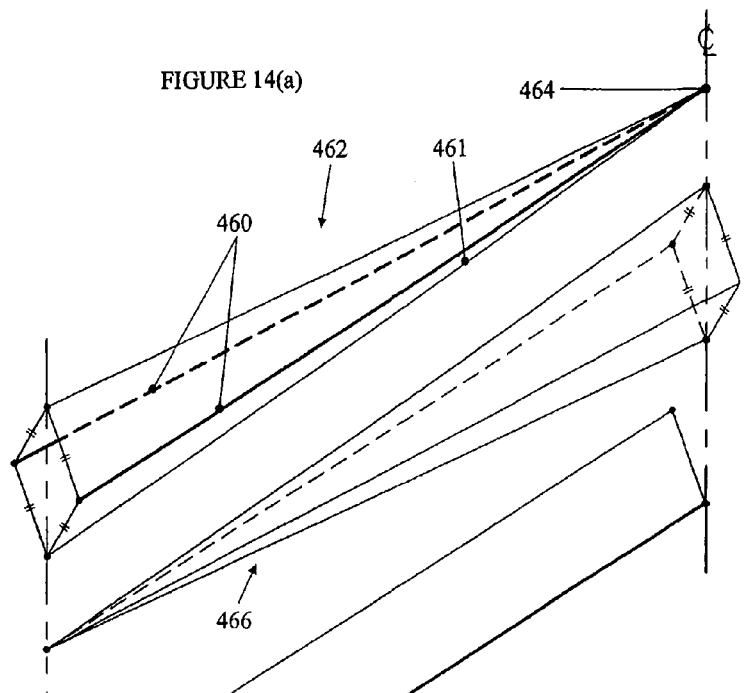
FIGS. 14(a)-14(e) are simplified isometric views showing an exemplary geometric arrangement of the scraper blade and scraper support arms for converting rotation of the support arms to vertical displacement of the scraper blade in the vicinity of a flocculent collection trough.
Figure 14B:
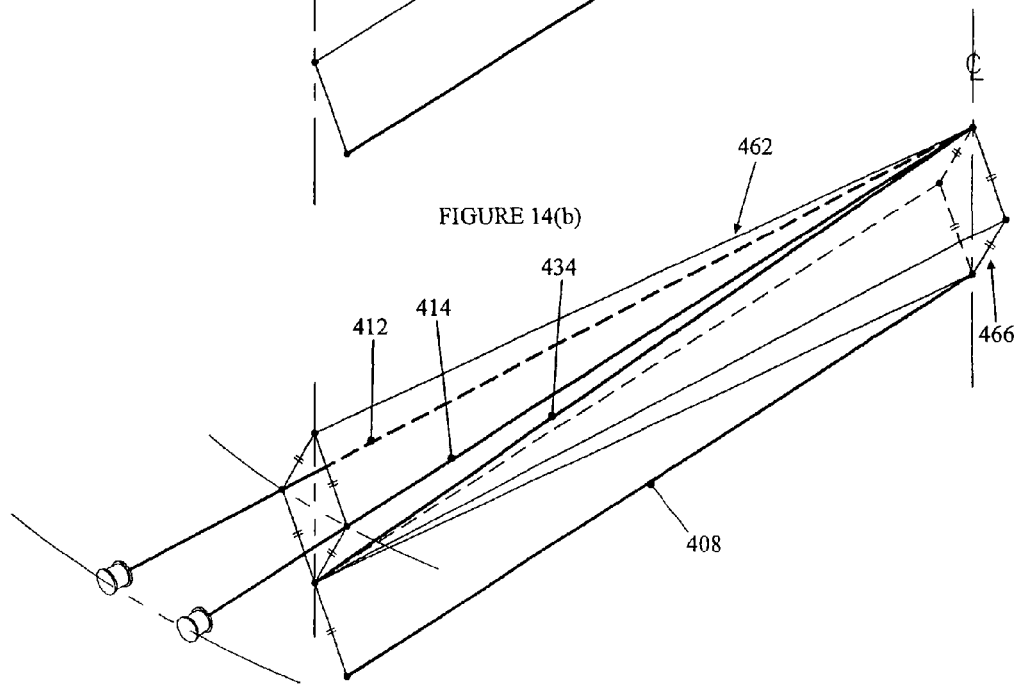
Figure 14C:
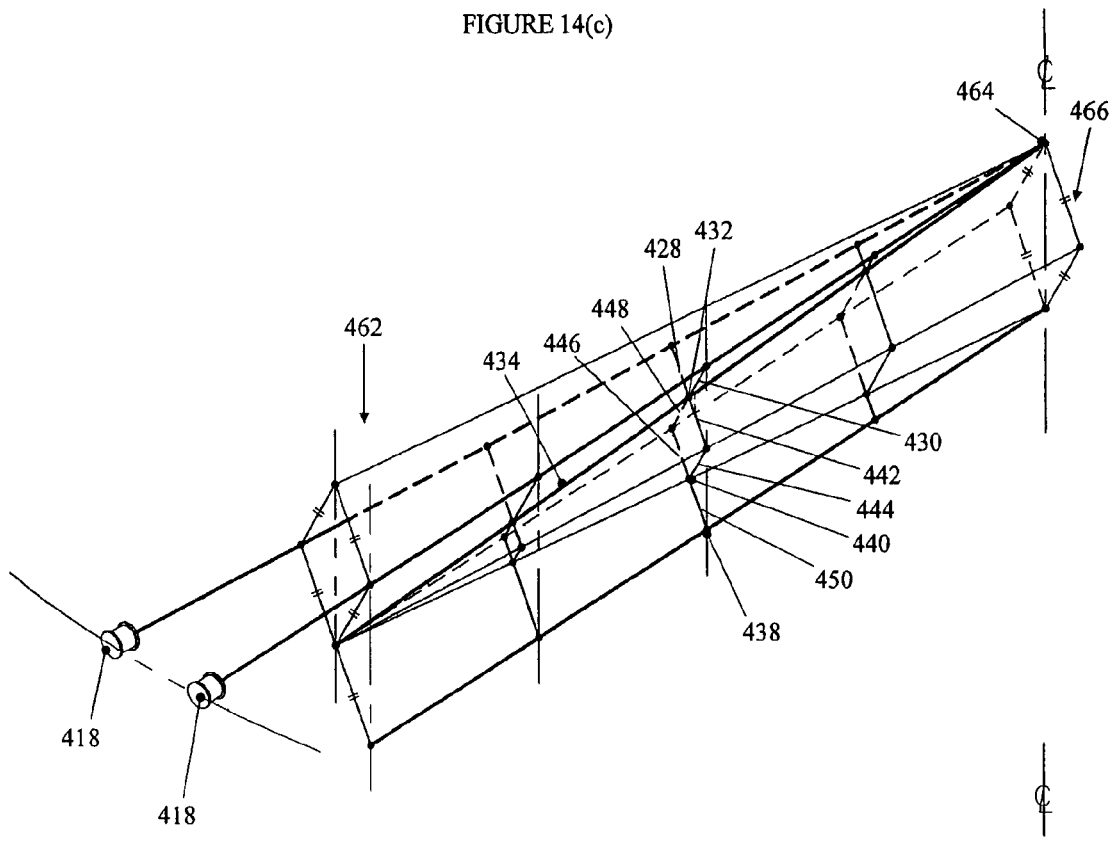
Figure 14D:
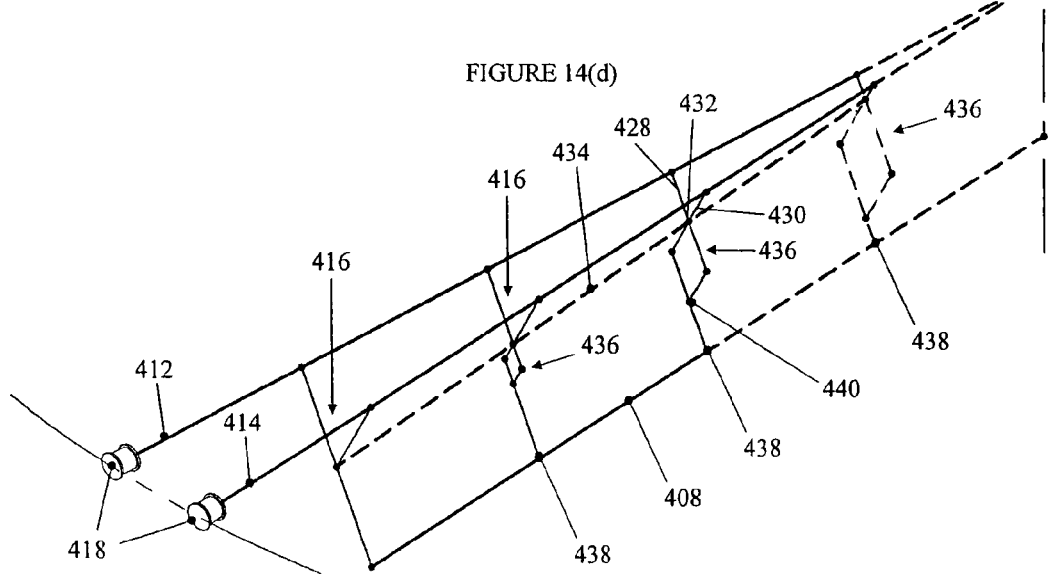

In a preferred embodiment of the invention scraper blade 408 is raised and lowered in a vertical plane in the vicinity of a trough 306. In order to achieve such movement, support arms 412, 414 preferably extend in a support plane above scraper blade 408 along radial lines corresponding to opposed edges 460 of an outwardly extending, truncated first rhombic pyramid 462 having an apex 464 located proximate the inner ends of support arms 412, 414 (FIGS. 14(a)-(e)). First connectors 432 (and stabilizer shaft 434 if one is provided) also preferably extend along a radial axis corresponding to an edge 461 of rhombic pyramid 462. Further, each second connector 438 is located in a vertical plane passing through the trailing support arm 414 at position where second segment 430 is connected thereto (FIG. 14(c)). Each third connector 440 is located on a vertical axis intersecting one of the first connectors 432. Further, the rhombic shape defined by third, fourth, fifth and sixth segments 442, 444, 446 and 448 corresponds to the cross-sectional shape of an inwardly projecting second rhombic pyramid 466 having its apex on the radial axis of stabilizer shaft 434, as best shown in FIGS. 14(b)-14(d). This geometric linkage arrangement causes true vertical displacement of scraper blade 408 along its radial line as the angular distance between support arms 412, 414 varies, as described below.

Figure 14E:
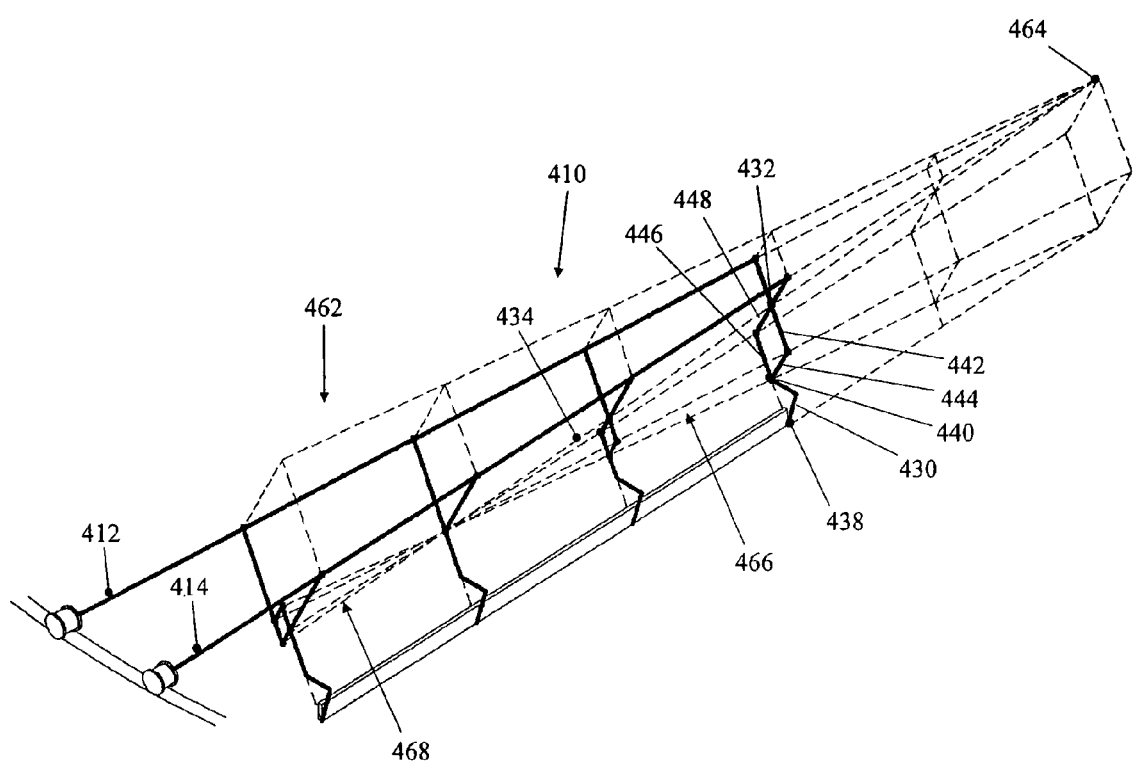

FIG. 14(e) illustrates the geometric relation of an alternative embodiment of the scraper blade support and lift mechanism 410 which is particularly well-suited for scraper blades 408 which are very long in length (e.g. clarifiers 10 of very large diameter). In this embodiment a third projecting rhombic pyramid 468 (i.e. in addition to first rhombic pyramid 462 and second rhombic pyramid 466) is shown in dashed lines. Rhombic pyramid 468 has an apex located on an edge of first rhombic pyramid 462 (for example, on a radial axis corresponding to stabilizer shaft 434) and notionally projects outwardly within pyramid 462. By contrast, second rhombic pyramid 466 has an apex located on an edge of first rhombic pyramid and projects inwardly externally of first pyramid 462. In the embodiment of FIG. 14(e), the apices of pyramids 466, 468 are at the same location (corresponding to the location of a first connector 432 in a central portion of mechanism 410).

As should be apparent to a person skilled in the art, rhombic pyramids 462, 466 and 468 of FIGS. 14(a)-14(e) are provided to more clearly show the geometric and spacial relationship between parts of the scraper blade support and lift mechanism 410 enabling vertical displacement of scraper blade 408 while still permitting rotation of mechanism 410 along a radial line. Pyramids 462, 466 and 468 are presented for the purposes of illustration and do not necessarily correspond with specific structural parts of a working assembly.

FIG. 11 illustrates the physical relationship between a beach 210 and a scraper blade 408 as beach 210 begins to slide underneath a flocculent collection trough 306. As indicated above, in one embodiment of the invention front edge 314 of trough 306 may be a composite structure comprising various seals and plates. In particular, composite front edge 314 may comprise a metal wall 315 coupled to a stepped weir plate 317 and a cover plate 319. A spacer 323, which allows for clamping pressure on weir plate 317 as described below, is also disposed between cover plate 319 and wall 315 underneath weir plate 317. The various components of trough front edge 314 are held in place with fasteners 321. In other embodiments of the invention trough front wall 314 may have a unitary rather than a composite structure.

In the embodiment of FIG. 11, weir plate 317 has a plurality of steps formed therein. Depending upon the amount of flocculent flow required, any one of the step configurations may be chosen to control the degree of flocculent overflow into trough 306. Thus weir plate 317 is adjustable to control the effective height of trough front wall 314 at particular locations along its length. For example, weir plate 317 may be adjusted to preferentially permit portions of the float blanket formed within clarifier reservoir 104 to spill into an adjacent trough 306.

A flexible wiper 329 is loosely contained between cover plate 319 and wall 315 underneath spacer 323. Wiper 329 is prevented from falling out of containment by a pin 331 or other suitable fastener. In the illustrated embodiment, pin 331 extends through an aperture formed in wiper 329. As shown in FIG. 11, wiper 329 is preferably positioned vertically by a tapered ramp 215 formed at the leading edge 213 of beach 210 such that wiper 329 lightly contacts upper surface 212 as beach 210 travels under trough 306.

In operation, scraper blade 408 rests on or proximate to beach 210 until it engages front edge 314 of trough 306 whereupon it is lifted vertically as described above. As shown best in FIG. 11, scraper blade 408 may include a lower seal 470 for sealingly engaging blade 408 to beach 210. An adjustable wiper 472 may also be provided for sealingly engaging blade 408 to cover plate 319 (i.e. the outermost portion of trough front edge 314) during the period when blade 408 is lifted vertically. The position of wiper 472 is adjustable to ensure that scraper blade 408 will sealingly engage cover plate 319 irrespective of the exact orientation of trough 306.

Seal 470 and wipers 329 and 472 may be formed from a soft elastomeric material, for example. Other means for achieving sealing engagement may be envisaged by a person skilled in the art.

In the embodiment of the invention illustrated in FIG. 11 an adjustable pin 474 is provided for releasing clamping pressure on flexible wiper 472. In operation, as beach 210 and scraper blade 408 advance together, they eventually come in contact with cover plate 319 of trough front edge 314 and a loosely fitting seal is formed between flexible wiper 472 and cover plate 319. The scraper lifting mechanism then moves upward as described above allowing a cross bar 478 on pin 474 to contact wiper 472 thereby locking it in the appropriate position with respect to cover plate 319. Wiper 472 remains locked in that position until scraper blade 408 again contacts beach 210. This allows wiper 472 to conform to the cover plate 319 of the next-in-sequence trough 306 (which typically will require a somewhat different positioning of wiper 472).

Wipers 329 and 472, and seals 323 and 470, may be sectioned into 8-10 foot long lengths, for example, for ease of handling, installation and repair. The sectioned lengths may be reversible and interchangeable. Typically wiper 329 clears, or substantially clears, the end of beach 210 just as wiper 472 begins its vertical rise. Thus, for any one trough 306, just one wiper 329, 472 is in frictional engagement with its corresponding mating surface. (This assumes that scraper blade 408 is in the "full bite" position shown on the left-hand side of FIG. 8(c); if the scraper blade 408 is in the "half bite" position shown in the right-hand side of FIG. 8(c) or some other modified position, both wipers 329, 472 may be in frictional engagement simultaneously during part of the scraper blade lift cycle).

Clarifier 10 is configured to limit the frictional drag resulting from the operation of wipers 329, 472 and seal 470 in other respects. For example, in the illustrated embodiment only one of 5 wipers 472 is engagement with a corresponding trough front edge 314 at any given time.

In practice, ease of servicing wipers 329, 472 is important. In accordance with the invention, the scraper blade support mechanism 410 can be stopped in the "up" position with a blade 408 above a trough 306. By rotating a retainer thumb latch 494 upward, adjustable pin 474 can be removed. This in turn releases scraper blade 408 and wiper 472. One of the two vertical pins on each stabilizer link 451 may be pulled to allow blade 408 to be completed decoupled from support mechanism 410. Once blade 408 is removed, seal 470 may be easily serviced. As will be apparent to a person skilled in the art, servicing can be accomplished with very little tooling. Moreover, if any tools or parts are dropped by service personnel, they will be captured within a trough 306 and will not fall into clarifier reservoir 104.

During servicing, the scraper assembly 406, with blade 408 removed, may be rotated until beach 210 just begins to contact the next-in-sequence trough 306. Fasteners 321 may then be undone to permit cover plate 319 to be removed. Stepped weir plate 317 and wiper 329 may then be easily removed for servicing. As mentioned above, by positioning a beach 210 in close proximity to trough 306, no component parts will fall into clarifier reservoir 104 during servicing.

The point of rotation between support mechanism 410 and scraper blade 408 is labelled 492 in FIG. 11. Rotation point 492 should preferably be located as close as possible to plate 319 to maintain the correct geometry of the lifting mechanism as described above. Rotation point 492 is ideally located directly below the center-line of trailing support arm 414.

Adjustment of Scraper Blade Position Relative to Beach

An important feature of the invention is that the landing position of each scraper blade 408 on a corresponding beach 210 is adjustable to alter the capacity of clarifier 10. As described below, in order for the flocculent discharge ports 312 to open, a scraper blade 408 approaching a trough 306 in the direction of rotation must be in contact with or proximate to the upper surface 212 of a corresponding beach 210. The closer the contact point of scraper blade 408 to trough 306, the smaller the entrapped volume or "bite" of flocculent, such as RAS, and hence the smaller the batch discharge.

As discussed above, the flocculent outlet ports 208 are formed on the same cylinder 202 which supports beaches 210. Therefore, advancing or retarding the landing spot of the scraper blade 408 on beach upper surface 212 effectively changes the relationship of scraper blade 408 to an outlet port 208. Adjustment may be accomplished by lifting cylinder 402 relative to cylinder 202 along a part line between the two portions and adjusting the relative position of the cylinders. Moving scraper blade 408 forward or rearward on beach upper surface 212 effectively changes the active area or forward exposure of beach 210 which in turn proportionally changes the volume of flocculent discharged into a trough 306 as indicated above.

One means for incrementally adjusting the relative positions of cylinders 202, 402 is shown in FIG. 8(b). In this embodiment at least one flange 211 is coupled to cylinder 202. Flange 211 is alignable with a corresponding flange 409 mounted on cylinder 402. Flanges 211, 409 each include a plurality of apertures 217, 413 arranged at spaced intervals. One or more connector pins 415 may be inserted through apertures 217, 413 for releasably coupling flanges 211, 409 (and hence cylinders 202, 402) together in the desired orientation. Apertures 217, 413 may be drilled in a vernier pattern, for example, to enable fine, incremental adjustment of the relative position of cylinders 202, 402. In one embodiment apertures 217, 413 may be arranged to permit a maximum adjustment corresponding to the width of one trough 306

The embodiment of FIG. 8(b) is configured so that adjustment of the relative position of cylinders 202, 402 may be readily accomplished manually without the need for special tools or training. In order to make such an adjustment, connector pin 415 is removed and the forward/backward "jog" button on the drive motor is actuated to cause relative motion of cylinders 202, 402. Alternatively, the relative position of cylinders 202, 402 may be adjusted manually. Since upper cylinder 402 is relatively lightweight in comparison to lower cylinder 202, the cylinders will slide easily relative to one another along lubricated flanges 211, 409. As shown in FIGS. 8(a) and 8(b), a shutter plate 496 is mounted on upper cylinder 402 which changes the effective position of the trailing edge of the flocculent outlet port 208 as lower cylinder 202 is indexed relative to upper cylinder 402. That is, shutter plate 496 may be adjusted to alter the effective size of a flocculent outlet port 208 (FIG. 8(b)) and hence the timing of opening and closing of a corresponding flocculent discharge port 312 (flocculent discharge port 312 is opened when it comes into partial alignment or register with an outlet port 208).

This feature is best shown in FIG. 8(c). The sequence of drawings on the left-hand side of FIG. 8(c) shows in schematic plan view a beach 210 and scraper 408 assembly moving relative to a stationary seal 320. Seal 320 is mounted on a flocculent discharge port 312 at the inner end 308 of trough 306 (FIG. 7(a)). As explained above, flocculent flows through a discharge port 312 into a flocculent collection conduit 154 and thereafter into holding tank 124 of clarifier bowl subassembly 100. Seal 156 is provided at the outer end of each conduit 154 as shown in FIGS. 8(b) and 8(c). Seals 320 and 156 compensate for any out-of-roundness of rotating cylinder 202 in a manner similar to a disk brake caliper of a motor vehicle. Seal 156 is held in place by means of the liquid head that is imposed on it (due to the liquid head differential between the clarifier reservoir 104 and holding tank 124). Although seals 320, 156 are stationary, cylinders 202, 402 rotate relative thereto and hence the seals effectively function as sliding seals.

In operation, rotation of cylinder 402 is actuated by a sprocket 503 (FIG. 8(b)) driven by a motor 502 as described further below. Sprocket 503 engages a ring gear 405 located on the inner circumferential surface of cylinder 402. Rotation of cylinder 402 in turn causes rotation of shutter 496 attached thereto. In the middle, left-hand panel of FIG. 8(c), beach 210 has rotated 18° until the scraper blade 408 extending upwardly from the beach trailing end 214 contacts the front edge 314 of trough 306. Further rotation of cylinders 202, 402 through an arc of 18° causes blade 408 to be lifted upwardly as described above. In the meantime, flocculent discharge port 312 closes as shown in the bottom, left-hand panel of FIG. 8(c).

FIG. 8(c), right-side, shows the same sequence of movements of the scraper blade 408 and beach 210 assembly in an embodiment where blade 408 has been adjusted to a "half bite" position contacting beach upper surface 212 in a central region thereof rather than at the trailing end 214. This is accomplished as described above by changing the relative position of cylinders 202, 402 which in turn changes the position of shutter 496. As shown best in FIG. 8(c) shutter 496 remains in alignment with scraper blade 408 so that port 312 is fully open when scraper blade 408 contacts the front edge 314 of trough 306. Shutter 496 effectively closes port 312 when further rotation of cylinders 202, 402 (i.e. through an arc of 18°) causes blade 408 to be lifted upwardly to a position suitable for traversal over a trough 306. Thus shutter 496 alters the effective size of port 208 which in turn alters the port opening/closing timing of port 312.

As should be apparent to a person skilled in the art, at all selected index settings the flocculent discharge port 312 is designed to begin opening when the leading edge 213 of the beach 210 meets the front edge 314 of a flocculent collection trough 306 or shortly thereafter. By attaching shutter 496 to the upper rotating cylinder 402 which moves the scraper blades 408, and by forming flocculent outlet ports 208 in lower rotating cylinder 202, the timing of the opening and closing of the flocculent discharge ports 312 is automatically adjusted to accommodate any desired position of scraper blade 408 on beach 210. For example, as shown in FIG. 8(c), discharge port 312 is fully open when scraper blade 408 contacts the front edge 314 of trough 306 and fully closed when blade 408 is fully raised above trough 306 irrespective of whether blade 408 is in the "full bite" (left-hand side) or "half bite" (right-hand side) orientation. Thus the timing of discharge ports 312 is self-adjusting—when the position of the scraper blade 408 is altered relative to beach 210, the timing of opening and closing of a discharge port 312 is automatically adjusted due to the altered position of shutter 496.

Flocculent Discharge Cycle

In operation, trough 306 contains dilute flocculent remaining from the previous cycle at the beginning of a flocculent discharge cycle (i.e. when port 312 begins to open). This is desirable to prevent thickened flocculent "hang-ups" between batches. That is, if the flocculent contained within a trough 306 becomes overly viscous between discharges, it could interfere with the proper orientation of ports, seals or other system components. As soon as the leading edge 213 of beach 210 contacts the front edge 314 of trough 306, port 312 begins to open (i.e. port 312 begins to come into alignment with a moving port 208 formed on cylinder 202) thereby permitting rapid flow of dilute flocculent into holding tank 124. As trough 306 empties, thickened flocculent is displaced from the float subzone (defined by beach 210, scraper blade 408 and front edge 314 of trough 306) into the interior of trough 306. As indicated above, the position and orientation of stepped weir plate 317 (FIG. 11) may be adjusted to regulate the flow of flocculent into trough 306. For example, weir plate 317 may be oriented to preferentially permit flocculent flow from particular regions of the float blanket formed in the float subzone upstream from trough 306.

Thickened flocculent collected in trough 306 continues to be discharged from trough 306 through flocculent discharge port 312 until continued rotation of cylinders 202, 402 causes scraper blade 408 to contact front edge 314 of trough 306. At this time scraper blade 408 begins its vertical travel while beach 210 and flocculent outlet port 208 continue to rotate, causing flocculent discharge port 312 to gradually close. Flow into trough 306 is blocked by scraper blade 408 which is moving in a vertical direction along the front edge 314 to trough 306 as described above. By the time the scraper blade 408 reaches the top of its travel, flocculent discharge port 312 is now fully closed. Scraper blade 408 then traverses above trough 306 and trough 306 fills with dilute flocculent drawn from the area behind (i.e. upstream) of front edge 314 of trough 306 (i.e. from the right to the left direction in the drawing of FIG. 7(c)). This treatment region of clarifier 10 is now in the fill part of a "fill, float, draw" cycle. The rear edge 316 of trough 306 is preferably of sufficient height to prevent any flow of flocculent, mixed liquor or other liquid to be clarified thereover. The ability to close the flocculent discharge port 312 during the period that flow into trough 306 is blocked by scraper blade 408 is important—this prevents unwanted "short-circuiting" of dilute flocculent directly into trough 306 and through discharge port 312 into holding tank 124

Scrapers Drive, Cam Ring and Operator's Platform Subassembly

FIG. 9 illustrates the scrapers drive, cam ring and operator's platform subassembly 500 which is fixed in position relative to subassembly 100. Subassembly 500 includes an electric gear motor 502 for driving rotation of lower and upper rotating subassemblies 200, 400. Preferably both of such subassemblies are actuated by a common drive. For example, motor 502 may drive rotation of a sprocket 503 which engages ring gear 405 located on the inner circumferential surface of support cylinder 402 for actuating rotation thereof (FIG. 8(b)). Since cylinder 202 is coupled to cylinder 402, both cylinders (and their attached assemblies described above) will rotate in unison.

An emergency, low horsepower output gear motor 504 may also additionally be provided, such as a small air drive or gasoline/diesel motor. An operator platform 506 and servicing deck 508 are provided for operator access to motors 502, 504 and scraper assemblies 406. As shown in FIG. 2, servicing deck extends radially above scraper blade support mechanism 410. The torque delivered by motor 502 to cylinder 202 may be substantial. For example, in a medium sized clarifier 10 the torque will be on the order of 200,000 to 300,000 pound-feet and may exceed 500,000 pound-feet in the case of large clarifiers 10.

Subassembly 500 further includes a cam ring 510 having a plurality of actuating cams 512 formed therein. Each cam 512 includes a sloped first shoulder 514, a horizontally-extending surface 516 and a sloped second shoulder 518. Wheel 424 mounted at the inner end of each scraper leading support arm 412 rotates around cam ring 510 and traverses each cam 512. As shown best in FIGS. 10 and 12-13, as wheel 424 traverses first shoulder 514 of cam 512, the angular distance between leading and trailing support arms 412 and 414 increases due to stoppage (or deceleration) of trailing support arm 414 thereby causing upward vertical displacement of scraper blade 408. Thus vertical displacement of scraper blade 408 is actuated by cam 512 transmitting torque to leading support arm 412 which in turn causes support arms 412, 414 to spread apart (FIG. 10). As wheel 424 moves along surface 516, blade 408 is maintained in the elevated position (i.e. above a corresponding trough 306). As wheel traverses second shoulder 518 of cam 512, trailing support arm 414 accelerates and the angular distance between support arms 412, 414 decreases, causing scraper blade 408 to be displaced downwardly to its usual operating position resting on or proximate to an underlying beach 210. During the vertical displacement of scraper blade 408 described above the other scraper assemblies 406 coupled to cylinder 402 continue to rotate at a constant velocity.

Port Timing Sequence

Figure 15:
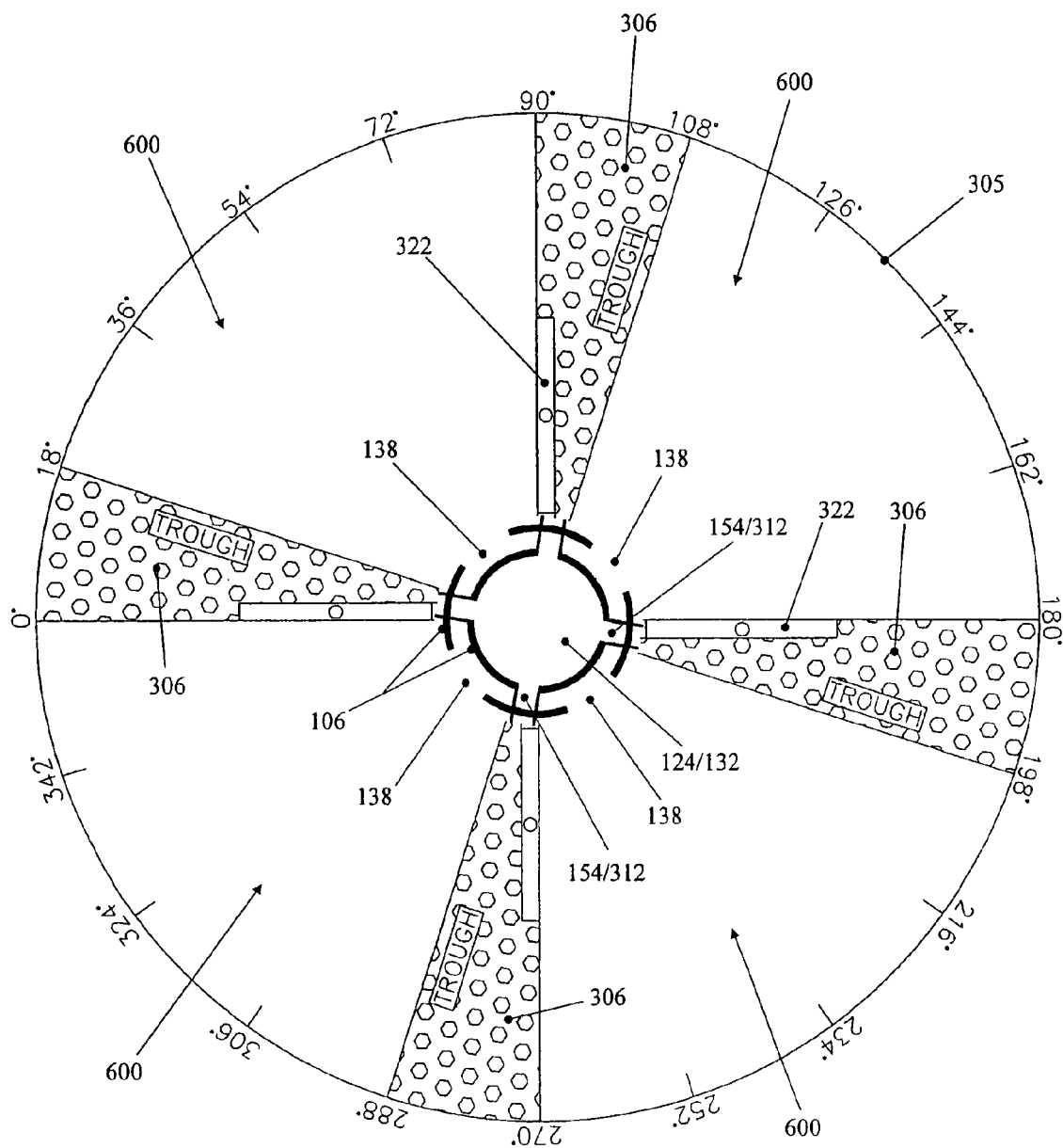
FIG. 15 is a simplified plan view showing the position of the influent feed ports, flocculent discharge ports and flocculent collection conduits relative to the troughs subassembly.

FIG. 15 is a simplified, plan view of a circular clarifier 10 having four equally spaced, stationary, radially extending flocculent collection troughs 306. Each trough 306 covers an 18° segment of clarifier 10. A plurality of liquid treatment regions 600 are defined between adjacent pairs of troughs 306. In the illustrated embodiment each treatment region 600 covers a 72° segment of clarifier 10. Each treatment region 600 receives a supply of mixed liquor (or other liquid to be clarified) through fixed influent feed ports 138 from influent supply chamber 132 located with central hub 106. As described above, central hub 106 also includes holding tank 124 for receiving flocculent from troughs 306 through flocculent discharge ports 312 and flocculent collection conduits 154. Feed ports 138 are periodically brought into alignment with rotating influent inlet ports 206 and flocculent discharge ports 312 are periodically brought into alignment with rotating flocculent outlet ports 208 (rotating ports 206, 208 are not shown in FIG. 15). In FIG. 15, stationary ports 138 and 312 are shown in concentric arrangement for the purposes of clarity. However, in one embodiment of the invention, ports 138, 312 may be superimposed or nearly superimposed above one another when clarifier subassemblies 100 and 300 are coupled together and hub 106 may have a constant diameter.

Figure 16:
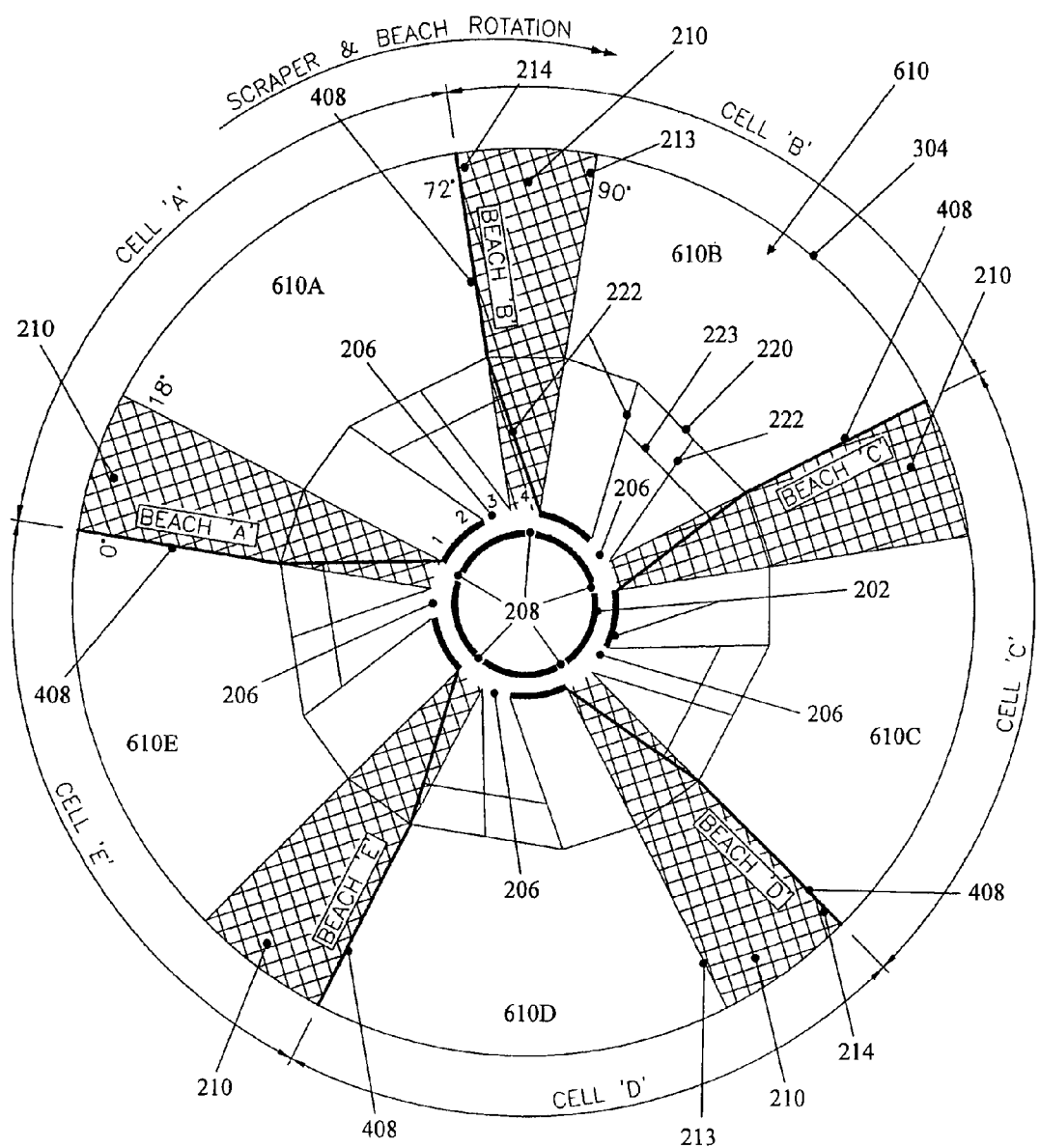
FIG. 16 is a simplified plan view showing the relative position of the influent inlet ports and flocculent outlet ports relative to the beaches and baffles of the lower rotating subassembly.

FIG. 16 is a simplified, plan view of lower and upper rotating subassemblies 200 and 400 which rotate around central hub 106 as described above. In the illustrated embodiment lower rotating subassembly 200 includes five radially extending beaches 210. Like troughs 306, each beach 210 covers an 18° segment of clarifier 10. As described further below, the number of beaches 210 differs from the number of troughs 306 to enable discharge of flocculent to holding tank 124 in timed batches (i.e. the discharge loading is intermittent).

As described above, each scraper blade 408 extends upwardly from the trailing edge 214 of a corresponding beach 210 and rotates in unison therewith (in a clockwise direction as denoted by the arrow in FIG. 16). A plurality of liquid treatment cells 610 (labeled A, B, C, D and E in FIG. 16) are defined between adjacent pairs of scraper blades 408 (and adjacent pairs of beach trailing edges 214). Each treatment cell 610 therefore covers a covers a 72° segment of clarifier 10. Since beaches 210 and scraper blades 408 are rotating around clarifier reservoir 104, the position of treatment cells 610 changes during operation of clarifier 10. FIG. 16 also includes a simplified showing of influent inlet ports 206 and flocculent outlet ports 208 which are formed on rotating cylinder 202. In FIG. 16 moving ports 206 and 208 are shown in concentric arrangement for the purposes of clarity when in fact they may be superimposed above one another as shown in FIG. 6 (i.e. they may be both formed on cylinder 202).

In the illustrated embodiment, each flocculent outlet port 208 is aligned with a beach 210 and each influent inlet port 206 is located between adjacent pairs of beaches 210 (FIG. 16). Since treatment cells 610 are hydraulically connected, from approximately the mid-depth point of reservoir 104 to bottom floor 110, any fluid removed from the middle or lower portions of clarifier 10 flows continuously from all cells 610 (this is true for both effluent and bottom recycle).

Figure 17:
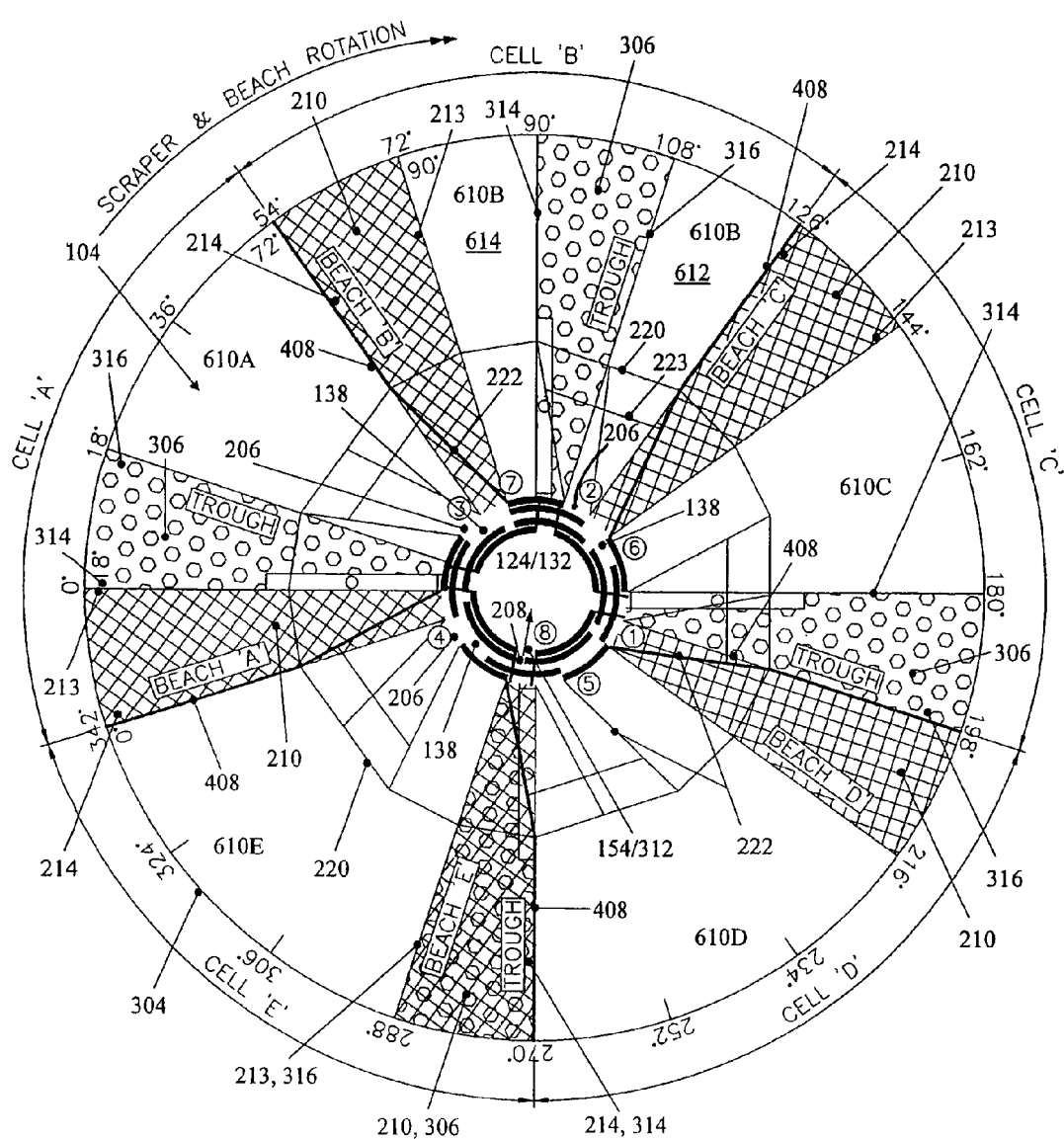
FIG. 17 is a simplified plan view showing the rotating structures of FIG. 16 superimposed on the fixed structures of FIG. 15 at a selected time period.
Figure 18:
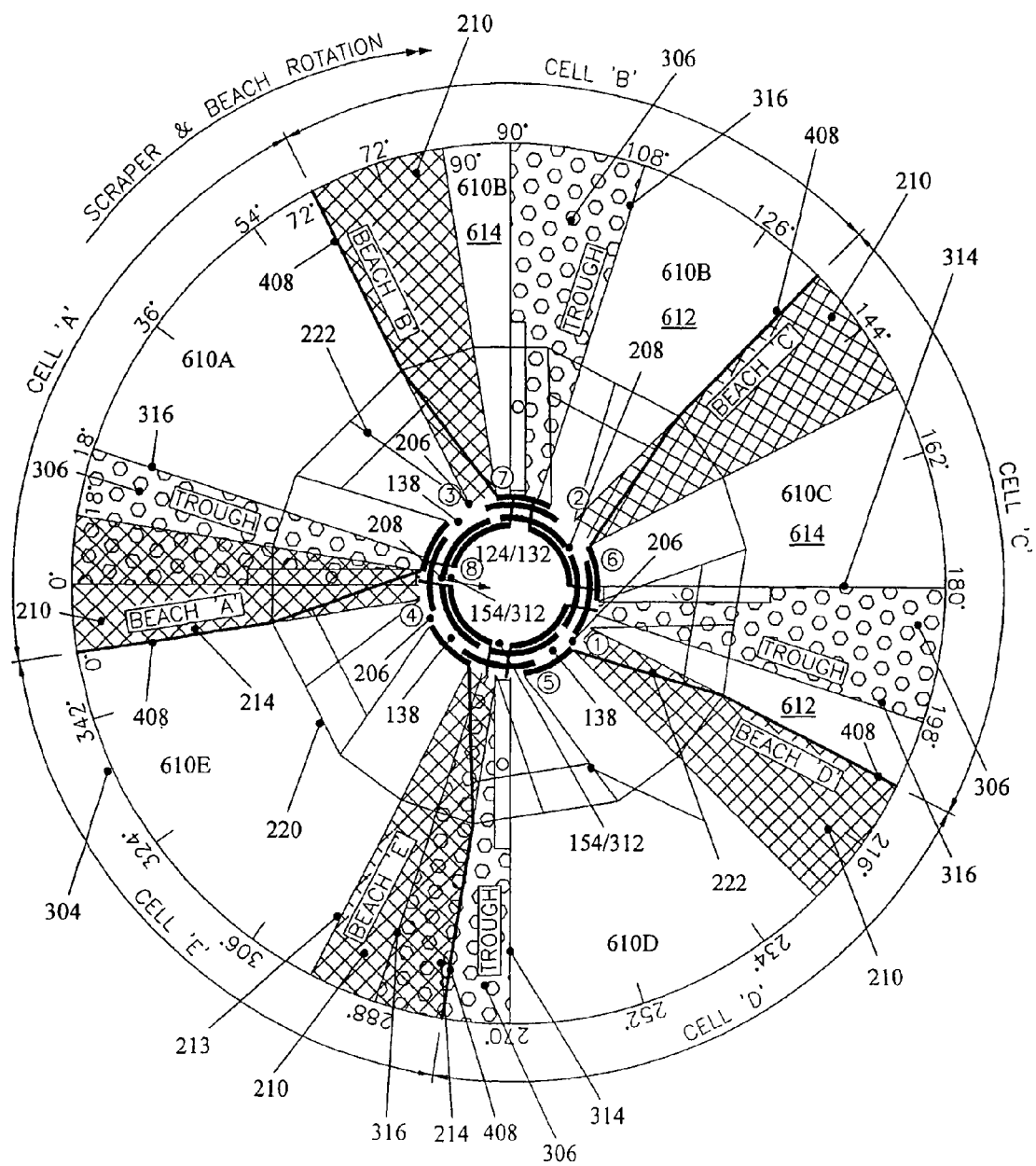
FIG. 18 is simplified plan view showing the structures of FIG. 17 at a later period in time showing the lower rotating subassembly rotated by a segment of 9°.
Figure 19:
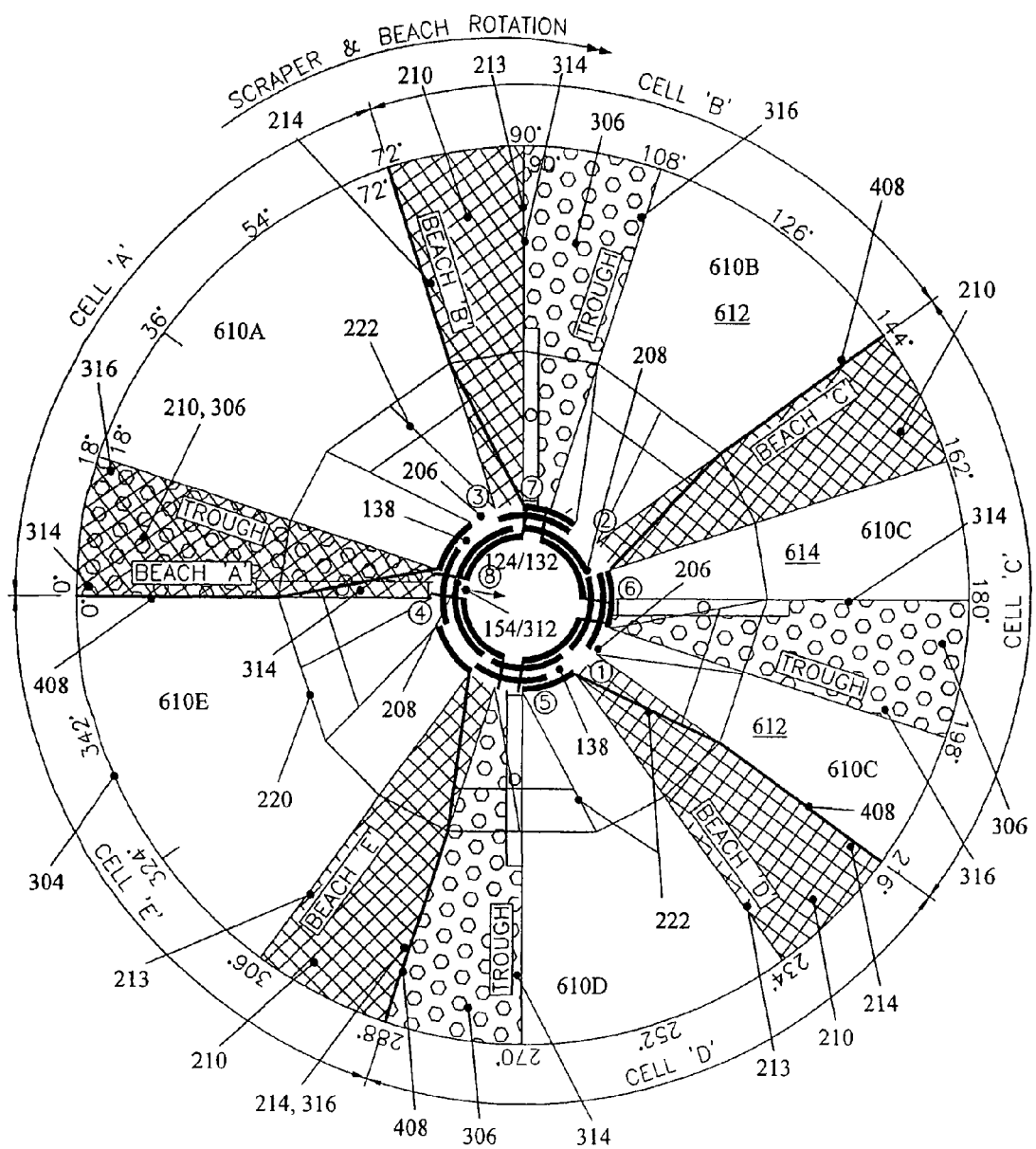
FIG. 19 is simplified plan view showing the structures of FIG. 17 at a later period in time showing the lower rotating subassembly rotated by a segment of 18°.

FIGS. 17-19 shows the rotating subassemblies of FIG. 16 superimposed on the fixed trough subassembly of FIG. 15 to further illustrate the timed porting features of the invention (as explained above, although ports 138, 206, 208 and 312 are shown in concentric arrangement for the purposes of clarity, at least some of the ports may in fact be superimposed one above the other). Referring to FIG. 17 and liquid treatment cell 610 labeled "A" (i.e. 610A), a leading edge 213 of a beach 210 is aligned with the front edge 314 of trough 306. Thus beach 210 is about to begin sliding underneath a corresponding trough 306. In treatment cell 610A, movable inlet port 206 is in full register with fixed feed port 138 to enable full flow of influent from influent supply chamber 132 into reservoir 104 between rear edge 316 of trough 306 and the next-in-sequence beach 210.

Baffles 220, 222 direct the flow of influent introduced into each treatment cell 610. In particular, influent flows into cell 610 through a feed port 138 and is directed radially outwardly by skewed baffles 222. The canted mid-radius baffle 220 deflects the majority of the floating solids (or other separable matter) toward the surface of reservoir 104 to form a float blanket of flocculent. Some solids will settle between skewed baffles 222 and be removed from clarifier 10 via bottom rakes 226 as described above. In the region of the skewed radial baffle tie bars 223, which connect baffles 222 together, there is a gentle downward flow created by the upward flow between the adjacent baffles (FIG. 6).

Further, the closed portion between baffles 222 (denoted by numerals 1 and 2 in FIG. 16) defines a portion of each treatment cell 610 where fluid down-flow is allowed to occur in response to the fluid up-flow in the open portions between baffles 222 which are in direct communication with an open feed port 138 (such open portions are denoted by numerals 3 and 4, for example, in FIG. 16). This provides energy dissipation in an up-flow/down-flow manner around the intervening baffle 222 between the closed and open portions. The upflow in regions 3 and 4 in the vicinity of feed port 138 (FIGS. 16 and 17) is caused by the release of large bubbles contained in the influent liquid. As mentioned above, the presence of the upwardly directed mid-radius baffles 220 at the outer end of the skewed baffles 222 also contributes to up-flow in this region. In one embodiment, the horizontal inlet velocity of influent should be on the order of 10-15 feet per minute for good flocculation and flow distribution. In the case of the present invention, the horizontal inlet velocity may be advantageously reduced due to the presence of the vertical flow vector discussed above which helps dissipate the fluid energy.

Referring to treatment cell 610B of FIG. 17, an inlet port 206 is in partial alignment with a corresponding feed port 138 to permit partial introduction of influent into treatment cell 610B between the rear edge 316 of a trough 306 and the trailing edge 214 of a downstream beach 210 and scraper blade 408. In treatment cell 610B rotation of support cylinder 202 is causing increased opening of the feed port 138 aligned with that cell (i.e. port 206 is coming increasingly in register with port 138).

Referring next to treatment cell 610C, no inlet port 206 is in complete or partial register with a corresponding feed port 138. Accordingly, a wall portion of rotating cylinder 202 completely obstructs the feed port 138 in alignment with cell 610C to prevent introduction of influent thereinto. Accordingly treatment cell 610C is relatively quiescent to permit optimum flotation of flocculent as described further below.

Referring next to treatment cell 610D, here again no inlet port 206 is in complete or partial register with a corresponding feed port 138 and hence no influent is being introduced into cell 610D. In cell 610D beach 210 has moved directly underneath trough 306 and scraper 408 has been brought into alignment with front edge 314 of trough 306. Accordingly, in cell 610D movement of scraper blade 408 is causing flocculent to gently spill into trough 306. At the same time, a movable flocculent outlet port 208 has been brought into partial alignment with a flocculent discharge port 312 to allow discharge of flocculent from trough 306 into holding tank 124 as described above.

Finally, referring to treatment cell 610E, an inlet port 206 is in partial register with a corresponding feed port 138 to permit introduction of influent into cell 610E between the rear edge 316 of a trough 306 and the trailing end 214 of a downstream beach and scraper blade 408. Thus cell 610E is in a similar operational state to that of cell 610B. However, in cell 610E continued clockwise rotation of support cylinder 202 is causing increased closure rather than increased opening of the corresponding feed port 138.

Thus it can be seen from FIG. 17 that, due to the timed porting feature of the invention, cells 610A-610E are simultaneously in different operational states although influent is being introduced into reservoir 104 continuously from influent supply chamber 132. More particularly, one of the cells 610 (cell A) is fully filling, two cells 610 (cells B and E) are partially filling and two cells (cells C and D) are not filling. At the selected time only one of the troughs 306 (in cell D) is discharging flocculent through aligned ports 208, 312 into a flocculent collection conduit 154 and hence into holding tank 124.

FIG. 18 shows the configuration of FIG. 17 later in time with lower and upper rotating subassemblies 200, 400 (and hence beaches 210 and scraper blades 408) rotated clockwise a further 9° relative to stationary troughs 306. Referring to treatment cell 610A, at this selected time beach 210 is beginning to pass underneath a corresponding trough 306 and scraper blade 408 is approaching the front edge 314 of trough 306. Flocculent in advance of scraper blade 408 is beginning to spill into trough 306 and a flocculent outlet port 208 is beginning to come into alignment with a discharge port 312, thus enabling passage of flocculent from trough 306 into a flocculent collection conduit 154 and holding tank 124. Influent continues to be introduced into treatment cell 610A between the rear edge 316 of trough 306 and the next-in-sequence beach 210, but feed port 138 aligned with cell 610A is beginning to close (i.e. inlet port 206 and feed port 138 are now only in partial alignment).

At the selected time shown in FIG. 18, trough 306 is disposed approximately mid-way between the two scraper blades 408 defining treatment cell 610B. An influent inlet port 206 is almost in full alignment with a corresponding feed port 138 and influent is continuing to be introduced into cell 610B in a fill subzone 612 defined between the rear edge 316 of trough 306 and the next-in-sequence scraper blade 408 and beach 210.

Referring now to cell 610C, at the selected time shown in FIG. 18 an inlet port 206 is beginning to be brought into alignment with a corresponding feed port 138 and hence influent is now beginning to be introduced downstream of the trough rear edge 316. Upstream (i.e. counterclockwise) from the trough front edge 314 the mixed liquor or other liquid to be clarified is continuing to be maintained in a substantially quiescent state.

Referring next to cell 610D at the selected time shown in FIG. 18, no inlet port 206 is in alignment with a corresponding feed port 138 and hence feed port 138 in cell 610D remains closed. As a result, no influent is being introduced directly into cell 610D and the mixed liquor therein is therefore substantially quiescent. The leading edge 213 of beach 210 has now advanced beyond the rear edge 316 of trough 306. Scraper blade 408, located at the trailing edge 214 of beach 210, has traversed mid-way across trough 306 at an elevated position above trough 306. By this time outlet port 208 has moved out of register with discharge port 312 aligned with cell 610D and hence port 312 is closed, thereby preventing discharge of any further flocculent from cell 610D into holding tank 124.

Referring lastly to cell 610E at the selected time shown in FIG. 18, inlet port 206 is continuing to move further out of alignment with a corresponding feed port 138. However, feed port 138 remains open a small amount to permit continued introduction of influent into treatment cell 610E at a location between the rear edge 316 of trough 306 and next-in-sequence beach 210 and scraper blade 408.

FIG. 19 shows the configuration of FIG. 18 later in time with lower and upper rotating subassemblies 200, 400 (and hence beaches 210 and scraper blades 408) rotated clockwise a further 9° relative to stationary troughs 306 (i.e. rotated a total of 18° relative to the configuration of FIG. 17). Referring to treatment cell 610A, at this selected time beach 210 has now passed fully underneath trough 306 and hence beach 210 and trough 306 are in full alignment. Scraper blade 408 is being lifted vertically along the front edge 314 of trough 306 as described above and flocculent in advance of scraper blade 408 is continuing to spill into trough 306. Flocculent outlet port 208 continues to be in partial alignment with discharge port 312, permitting continued discharge of flocculent into holding tank 214 (as shown by an arrow in FIG. 19). At this point in time cell 610A is the only treatment cell 610 from which flocculent is being discharged. Influent continues to be introduced into treatment cell 610A between the rear edge 316 of trough 306 and the next-in-sequence beach 210 and scraper blade 408 but feed port 138 is continuing to close (i.e. inlet port 206 is now in a lesser degree of alignment with feed port 138 as compared to the configurations of FIGS. 17 and 18).

Referring now to treatment cell 610B, at the selected time shown in FIG. 19 the leading edge 213 of beach 210 is now aligned with the front edge 314 of trough 306. Additionally inlet port 206 is now in full alignment with a corresponding feed port 138. Accordingly, influent is being introduced into treatment cell 610B at a maximum rate.

Referring next to treatment cell 610C, at the selected time shown in FIG. 19, an inlet port 206 is in partial alignment with a feed port 138 and influent is being introduced between the rear edge 316 of trough 306 and the downstream (i.e. clockwise direction) scraper 408. However, no influent is being introduced into treatment cell 610C upstream of trough 306 (i.e. in a counterclockwise direction).

Referring next to treatment cell 610D at the selected time shown in FIG. 19, scraper blade 408 has now traversed across the entire width of trough 306 at an elevation above trough 306. Scraper blade 408 then descends at the rear edge 316 of trough 306 back into contact with or proximate to beach 210. Inlet ports 206 and feed ports 138 continue to be misaligned and hence no influent is flowing into treatment cell 610D.

Referring lastly to cell 610E at the selected time shown in FIG. 19, inlet port 206 has moved entirely out of alignment with the corresponding feed port 138 and hence feed port 138 is now fully closed. The mixed liquor or other liquid to be clarified resident within cell 610E is therefore relatively quiescent to facilitate flotation of flocculent therein.

As should be apparent from FIGS. 17-19 in view of the above description, each cell 610 may be in one of several operational states at any selected time depending upon the relative position of a beach 210, scraper blade 408 and trough 306. For example, cell 610 is in a "fill" operational state when a feed port 138 in communication with cell 610 is fully open (i.e. feed port 138 and inlet port 206 are fully aligned) and the entire available treatment area of cell 610 is receiving influent. By way of illustration, cell 610A in FIG. 17 is in a "fill" state.

By contrast, cell 610 is in a "float" operational state when feed port 138 is fully closed (i.e. feed port 138 is not in alignment with an inlet port 206) and hence no influent is being introduced into cell 610. In the "float" operational state the entire available treatment area of cell 610 is relatively quiescent and undisturbed to optimize flotation of flocculent. By way of illustration, cell 610D in FIG. 17 is in a "float" state.

Further, cell 610 is in a "fill/float" operational state when a fill subzone 612 of cell 610 is filling while another separate float subzone 614 of cell 610 is floating. In this case a feed port 138 is in only partial alignment with an inlet port 206 and only the fill subzone 612 is receiving a supply of influent. By way of illustration, cell 610B in FIG. 17 is in a "fill/float" operational state. In particular, the fill subzone 612 between the rear edge 316 of trough 306 and the next-in-sequence beach 210 and scraper blade 408 is filling with influent and the float subzone 614 between the front edge 314 of trough 306 and the previous-in-sequence scraper blade 408 is quiescent and is not receiving any influent. As the two scraper blades 408 defining a cell 610 continue to rotate relative to a stationary trough 306, the fill subzone 612 becomes relatively larger and the float subzone 614 becomes relatively smaller (although the treatment cells 610 are hydraulically connected as described above, the surface area between a selected trough 306 and scraper blade 408 changes as assembly 406 rotates within clarifier bowl 102). For example, referring again to cell 610B in FIG. 17, the fill subzone 612 covers a segment 18° in size and the float subzone 614 covers a segment 36° in size (including the portion above beach 210). Referring to FIG. 18, when beaches 210 and scraper blades 408 have rotated a further 9°, both the fill subzone 612 and the float subzone 614 of cell 610B cover a segment 27° in size. Referring now to FIG. 19, when beaches 210 and scraper blades 408 have rotated a further 9° the fill subzone 612 of cell 610B covers a segment 36° in size and the float subzone 614 of cell 610B covers a segment 18° in size (i.e. only the portion above beach 210). As indicated above, depending upon the time in the cycle, one of the float subzone 614 or the fill subzone 612 may be reduced to zero and the other subzone may be at its maximum size.

As beach 210 rotates through a treatment region 600 of clarifier 10 between troughs 306 (FIG. 15), it creates a shear plane below the level of the flocculent blanket forming on the surface of the liquid. When the leading edge 213 of the beach 210 reaches the front edge 314 of the next trough 306 in the direction of rotation (see, for example treatment cell 610A of FIG. 17 or treatment cell 610B of FIG. 19), it forms the bottom boundary of the float subzone 614. The floating flocculent is therefore confined within the float subzone 614 (i.e. bounded by beach 210, scraper blade 408, front edge 314 of trough 306, rotating cylinder 202 and outer baffle 304). At this point in the cycle the float subzone 614 is confined above beach 210 and is not hydraulically connected to the fill subzone 612.

As beach 210 and scraper blade 408 continue to rotate, the volume of the float subzone 614 decreases progressively which causes the liquid confined within the float subzone 614 to rise. In particular, the float blanket on the surface of the liquid confined within the float subzone 414 rises in a manner analogous to a ship rising in a water lock to an elevation above the fill level of the remainder of the liquid contained within reservoir 104. As scraper blade 408 continues to rotate, the float blanket of flocculent is lifted to a height sufficient for it to gently spill over front edge 314 into trough 306. This feature of the invention minimizes disruption of fragile flocculent.

Shortly after the leading edge 213 of beach 210 moves into alignment with the front edge 314 of the next trough 306 in the direction of rotation, a "draw" operational state begins wherein flocculent from the float subzone 614, which spills into trough 306 as discussed above, is drawn through discharge port 312 into a collection conduit 154 and hence into holding tank 124. By way of illustration, cell 610A in FIG. 17 is about to begin the draw state and cell 610E has just finished the draw state. During the draw state flocculent outlet port 208 and flocculent discharge port 312 are brought into at least partial alignment (i.e. port 312 is open). The draw state begins when port 312 opens and continues for approximately 18° of rotation of lower and upper rotating subassemblies 200, 400 during which time scraper blade 408 contacts and traverses up front edge 314 of trough 306 to a position above trough 306 as described above. During the draw state the fill subzone 612 of the treatment cell 610 (i.e. downstream or in a clockwise direction from the rear edge 316 of trough 306) can continue to receive influent while scraper blade 408 traverses over trough 306.

When scraper blade 408 reaches the rear edge 316 of trough 306 it descends rapidly downwardly as described above on or proximate to beach 210 near the trailing edge 214 thereof (in the case of the "full bite" adjustment of FIG. 8(c)). This marks the end of the draw state for the treatment cell 610 in question.

As will be appreciated by a person skilled in the art, each treatment cells 610 cycles through the above described fill, float and draw operational states as lower and upper rotating subassemblies 200, 400 rotate relative to fixed subassemblies 100, 300 and 500. With reference to the illustrated embodiment of FIGS. 17-19, at each 18° interval one feed port 138 aligned with one treatment cell 610 is fully open, two feed ports 138 aligned with two different treatment cells 610 are partially open (one port 138 is opening and one closing), and two feed ports 138 aligned with the remaining two treatment cells 610 are fully closed. By way of example, comparing FIGS. 17 and 19, the operational state of cell 610A shown in FIG. 17 is the same as the operational state of cell 610B shown in FIG. 19; the operational state of cell 610B shown in FIG. 17 is the same as the operational state of cell 610C shown in FIG. 19; the operational state of cell 610C shown in FIG. 17 is the same as the operational state of cell 610D shown in FIG. 19; the operational state of cell 610D shown in FIG. 17 is the same as the operational state of cell 610E shown in FIG. 19; and the operational state of cell 610E shown in FIG. 17 is the same as the operational state of cell 610A shown in FIG. 19.

The timed porting feature of the invention, including the fill, float, and draw sequences, is further illustrated with reference to Table 1 below. Table 1 illustrates the operational state of each of five treatment cells 610 (i.e. A, B, C, D and E) as subassemblies 200, 400, including beaches 210 and scrapers 408, rotate within clarifier bowl 102 in successive 18° intervals. Although FIGS. 17 and 19 illustrate only the first 18° rotational interval, it will be appreciated by a person skilled in the art that rotation of the various rotating clarifier components would continue in the same manner. The left column of Table 1 records the clockwise degrees of rotation (e.g. of beaches 210 and scraper blades 408) and the top row describes the position of the feed ports 138 aligned with each selected cell 610 (except in the case of the draw state where opening of flocculent discharge port 312 is referred to). Information is recorded in Table 1 for each of the five treatment cells 610A-E at each 18° interval of rotation.

TABLE 1

| | Fill | | | | Float/Dwell/Draw | | | |
|---|---|---|---|---|---|---|---|---|
| | 0° | 18° | 36° | 54° | 72° | 90° | 108° | 126° 144° |
| Scraper and Beach Rotation ↓ (clockwise) FC = full closed | Fill Cycle (Back of Scraper) Duration 72° | | | | Float Cycle (Front of Scraper) Duration 54° | | | Draw |
| ½C = half closed FO = full open ½O = half open | Port FC → ½O; begin fill | Port ½O → FO; cont. fill | Port FO → ½C cont. fill | Port ½C → FC end fill | Port FC → FC begin float | Port FC → FC cont. float | Port FC → FC end float | Duration 18° Port FC → FO |
| Drawing location | ① | ② | ③ | ④ | ⑤ | ⑥ | ⑦ | ⑧ |
| 0°-18° | C | B | A | E | D | C | B | A |
| 18°-36° | D | C | B | A | E | D | C | B |
| 36°-54° | E | D | C | B | A | E | D | C |
| 54°-72° | A | E | D | C | B | A | E | D |
| 72°-90° | B | A | E | D | C | B | A | E |
| 90°-108° | C | B | A | E | D | C | B | A |
| . | . | . | . | . | . | . | . | . |
| . | . | . | . | . | . | . | . | . |
| . | . | . | . | . | . | . | . | . |
| 162°-180° | B | A | E | D | C | B | A | E |
| Repeat cycle for: 180°-270° 270°-360° | | | | | | | | |

As discussed above, each treatment cell 610 is arbitrarily defined between a pair of spaced-apart scraper blades 408, namely a leading scraper blade 408 traveling in the direction of rotation and a trailing scraper blade 408 traveling behind the leading blade in the same direction of rotation. Due to this spaced radial arrangement, a leading scraper blade 408 defining the leading boundary of one selected treatment cell 610 is also the trailing scraper blade 408 of the immediately downstream (i.e. clockwise direction) treatment cell 610. Conversely the trailing scraper blade 408 defining the trailing boundary of a selected treatment cell 610 is the leading scraper blade 408 of the immediately upstream (counter-clockwise direction) treatment cell 610. Thus the position of each cell 610 is changing with time as the scraper blades 408 rotate as described above. Each cell 610 is therefore sequentially brought into alignment with different feed ports 138 which are fixed in position on central hub 106 (FIG. 5). As described above, feed ports 138 may either be fully open, partially open and partially closed, or fully closed depending upon whether they are fully or partially aligned with one of the rotating inlet ports 206 formed on rotating cylinder 202. In the illustrated embodiment (FIGS. 2 and 3), clarifier 10 includes four fixed feed ports 138 and five rotating inlet ports 206. Accordingly, for each complete rotation of cylinder 202, each feed port 138 is fully open 5 times.

As will be appreciated by a person skilled in the art, the port timing mechanism illustrated in FIGS. 17-19 and Table 1 and described above is for illustrative purposes only. The number, size, shape and location of ports 138, 206, 208 and 312 may vary according to the process design requirements of clarifier 10. For example, the exact size and location of the ports may be optimized to satisfy the process requirements of a specific application using computational fluid dynamics analyses and the like.

In the example shown in FIGS. 17-19 and Table 1, if a particular treatment cell 610 straddles a fixed trough 306, cell 610 is subdivided into a fill subzone 612 between trough 306 and the leading scraper 408 and a float subzone 614 between the same fixed trough 306 and the trailing scraper 408 (see, for example, cell 610B in FIG. 17). The inlet ports 206 are aligned so that only the fill subzone 612 of cell 610B is in communication with an open feed port 138 to permit influent inflow. The float subzone 614 does not directly receive a supply of influent and therefore remains relatively undisturbed. In other words, during the period that a trailing scraper blade 408 is positioned on a corresponding beach 210 spaced-apart from a trough 306, the area clockwise from the scraper blade 408 to the next-in-sequence trough 306 is available for flotation whereas the area counter-clockwise from the scraper blade 408 (i.e. in the next-in-sequence treatment cell 610) is available for filling.

As the scraper blades 408 rotate, the leading scraper blade 408 will continue to move away from a fixed trough 306 and hence the fill subzone 612 will expand in size as described above. Conversely, as the trailing scraper blade 408 moves toward a fixed trough 306 the float subzone 614 will become progressively smaller. Eventually the beach 210 disposed below the trailing scraper blade 408 will reach the front edge 314 of a trough 306 (for example, as shown in cell 610A in FIG. 17). At this point beach 210 forms the bottom boundary of the float subzone 614 as described above. As cylinders 202 and 402 continue to rotate, beach 210 will begin to slide underneath trough 306 (see cell 610A in FIG. 18) and the flocculent from the float subzone 614 will spill into trough 306 and be discharged through flocculent discharge port 312 as described above. When the trailing scraper blade 408 reaches the front edge 314 of trough 306, the float subzone 614 has in effect been reduced to zero and the fill subzone 612 of the treatment cell 610 has increased to its maximum size (54° in this example as shown in 610A of FIG. 19).

The trailing scraper 408 then traverses over trough 306 as described above and descends at the rear edge 316 of trough 306 back on or proximate to beach 210 (see, for example, cell 610D of FIG. 17). At this stage the cell 610 does not straddle a trough 306 (i.e. the leading scraper blade 408 is aligned with the front edge 314 of one trough 306 and the trailing scraper blade 408 is aligned with the rear edge 316 of another trough 306). Accordingly, at this stage the cell 610 is not subdivided into a separate fill subzone 612 and float subzone 614. Rather the entire cell 610 constitutes a float subzone 614 of maximum size. Continued rotation of the scraper blades 408 causes the leading scraper blade 408 to move away from the trough 306 until cell 610 straddles a trough 306 and the cell 610 is therefore once again subdivided into a separate fill subzone 612 receiving influent and a float subzone 614 not directly receiving influent. The inlet ports 206 are configured to begin opening a feed port 138 to permit passage of influent into the fill subzone 612 as soon as the leading scraper blade 408 passes the rear edge 316 of a trough 306). For example, referring to FIG. 18 and cell 610C, when the leading scraper blade 408 moves away from trough rear edge 316, influent begins to flow into fill subzone 612 between scraper blade 408 and trough 306.

Referring again to Table 1, the fill cycle occurs behind the direction of rotation of the leading scraper blade 408 (i.e. between the leading scraper blade 408 and an upstream trough 306) whereas the float cycle occurs in advance of the trailing scraper blade 408 (i.e. between the trailing scraper blade 408 and a downstream trough 306). The draw state, during which time the flocculent is spilled into a trough 306 and discharged therefrom through ports 312, occurs toward the end of the float cycle in advance of the trailing scraper blade 408.

The timed porting features of the invention summarized in Table 1 may be further illustrated by considering a specific treatment cell 610, namely treatment cell 610C of FIGS. 17-19. At an arbitrary initial time the leading boundary (i.e. leading scraper blade 408) of cell 610C has just passed over a trough 306 and is aligned with the rear edge 316 of the trough 306. The fill cycle is therefore about to begin. At this point cell 610C is not in communication with an open feed port 138 and the entire flocculent contents of the cell 610C are floating relatively undisturbed. Rotation of cell 610C from 0° to 18° (i.e. due to rotation of lower and upper subassemblies 200, 400 relative to fixed subassemblies 100, 300 and 500) causes cell 610C to become subdivided into separate fill and float subzones 612, 614 (FIG. 19). In particular, fill subzone 612 is brought into communication with a feed part 138 which has been adjusted from a fully closed to a half open configuration as the feed port 138 becomes aligned with an inlet port 206. Meanwhile, a different feed port 138 aligned with float subzone 614 remains closed and hence flocculent in this subzone 614 continues to float relatively undisturbed. The timed porting feature of the invention therefore essentially permits batch flotation of the mixed liquor or other influent (i.e. in the relatively undisturbed float subzones 614) even though the overall infeed/outfeed process is continuous.

Continued rotation of cell 610C from 18° to 36° as shown in Table 1 causes the feed port 138 aligned with fill subzone 612 to be adjusted from a half open to a fully open position (i.e. this feed port 138 is now fully aligned with an inlet port 206). The feed port 138 aligned with float subzone 614 remains fully closed. As the treatment cell 610C rotates, the fill subzone 612 is becoming progressively larger and the float subzone 614 is becoming progressively smaller.

Continued rotation of cell 610C from 36° to 54° as shown in Table 1 causes the feed port 138 aligned with fill subzone 612 to be adjusted from a fully open to a half closed position (i.e. this feed port 138 is now only partially aligned with an inlet port 206). The fill subzone 612 continues to become progressively larger in size. At the same time the float subzone 614 is reducing in size to zero as the float cycle ends and the floated flocculent spills over into a trough 306 and is discharged through a discharge port 312 and collection conduit 154 into holding tank 124. Accordingly two separate functions, namely filling and drawing are occurring within cell 610C simultaneously at different locations. This "feed port overlap" feature enhances the flotation capacity of clarifier 10. By the end of this segment of rotation the trailing scraper blade 408 is aligned with the front edge 314 of a trough 306.

Continued rotation of cell 610C from 54° to 72° as shown in Table 1 causes the feed port 138 aligned with fill subzone 612 to be adjusted from a half closed to a fully closed position (i.e. this feed port 138 is now fully obstructed by a wall portion of cylinder 202). The fill subzone 612 has now achieved its maximum size, the fill cycle for this treatment cell 610C has ended and a float cycle is about to begin. At the same time the trailing scraper blade 408 has lifted off of its corresponding beach 210 and is traversing above a trough 306 as described above.

Continued rotation of cell 610C from 72° to 90° causes the trailing scraper blade 408 to rotate away from the rear edge 316 of a trough 306 while the leading scraper blade traverses over the next-in-sequence trough 306 as described above. During this period cell 610C is in alignment with a single feed port 138 that remains fully closed.

The above described fill, float draw cycle is then repeated for rotation of cell 610C between further rotation intervals, namely 90° to 180°, 180° to 270° and 270° to 360°. Accordingly, in this example, one full 360° rotation of rotating subassemblies 200, 400 relative to fixed subassemblies 100, 300 and 500 causes treatment cell 610 to spill its share of floated flocculent four separate times into four separate troughs 306. Meanwhile the same operational cycles are ongoing in the other cells 610 in a staggered time sequence as shown in Table 1. For example, with reference to Table 1, it is apparent that treatment cell 610A is in the same operational state during interval 0° to 18° as treatment cell 610C is during interval 36° to 54°. Accordingly, in this example, at any selected time only one of the five treatment cells 610 is in the draw state discharging flocculent (the port referred to in the draw state shown in the final column of Table 1 is the flocculent discharge port 312). This ensures that the discharge load is intermittent and achieves differential loading on the clarifier drive means.

Numerals 1-8 in Table 1 denote the locations identified in FIGS. 17-19. The left column of Table 1 represents a dynamic record of the fill-float-draw operational states (i.e. as each cell 610 rotates in sequence) while the rows of the table provide the same information under static conditions. The dynamic operation of a single cell 610 rotating clockwise 18° at a time can also be fully described by looking at the static representation shown in, for example, FIG. 17 and reading counter-clockwise one cell 610 at a time. In other words, in is example, as the mechanical rotation of a scraper blade 408 moves clockwise through a full cell segment of 72°, the sequence of opening of ports 138 moves counterclockwise (through 5 cell widths or 360 degrees).

In summary, as exhibited by Table 1 and the above-described example, as soon as a scraper blade 408 descends at the rear edge 316 of any one trough 306, the first cell 610 located clockwise from the trough 306 begins a float cycle for 54° of rotation while the cell 610 located counter-clockwise from the first cell 610 begins a fill cycle for 72° of rotation (as explained above filling may occur within a treatment cell 610 during the drawing state). That is, in any pair of adjacent cells 610, the clockwise cell 610 is in the float portion of the cycle while simultaneously the counter-clockwise cell 610 is in the fill portion of the cycle in this example. Shortly after the leading edge 213 of beach 210 in any cell 610 reaches the front edge 314 of a trough 306 in that cell 610, the float cycle notionally ends and the draw cycle begins for approximately 18° rotation during which the flocculent collected in the float subzone 614 is gently spilled into the trough 306 and discharged into the holding tank 124. During the draw cycle the flocculent discharge port 312 aligned with the trough 306 in question opens.

When a beach 210 is passing under a trough 306 there is a "dwell" period of sufficient length for the upper rotating assembly 400 to traverse slightly more than 18°. This dwell period allows the scraper blade 408 to traverse over the trough 306 and rapidly descend on to its corresponding beach 210 as described above. The draw operational state may occur during a portion of the dwell period. For example, a flocculent discharge port 312 may be open during the initial portion of the dwell period as the trailing scraper blade 408 is lifted vertically. Port 312 then closes. One benefit of the means described herein to vertically displace the scraper blade 408 is that the blade 408 is lifted clear of the beach 210 above trough 306 for the shortest possible dwell period. In other words, each scraper blade 408 traverses substantially all of the available surface area of the treatment regions 600 defined between the troughs 306. Since the dwell period is minimized, the length of time available for filling and flotation is maximized, thereby optimizing the efficiency of clarifier 10. In alternative embodiments of the invention the length of the float cycle could be lengthened and the length of the fill cycle could be corresponding shortened. However, in the example shown in FIGS. 17-19, the combined length of the fill-float-draw periods does not exceed 144° of rotation for any pair of adjacent cells 610.

Operation

In operation, clarifier 10 is initially connected to an influent source, such as an upstream vertical shaft bioreactor providing a continuous supply of mixed liquor. As described above, the mixed liquor may be delivered to an influent supply chamber 132 located within a central hub 106 of clarifier 10 through supply lines 150, 152 (FIG. 5). The influent mixture is controllably introduced into clarifier reservoir 104 from supply chamber 132 through feed ports 138 in a timed sequence. As described above, feed ports 138 are periodically brought into alignment with inlet ports 206 formed on a cylinder 202 rotating around hub 106. The influent is initially supplied to reservoir 104 to a fill level approximating the elevation of flocculent collection troughs 306 which extend radially at spaced locations within the clarifier bowl 102.

Suspended solids (or other separable matter) present in the mixed liquor influent are caused to rise in reservoir 104, such as by a gas flotation process, to form a surface layer of flocculent. A plurality of rotating beaches 210 and scraper blades 408 are provided as described in detail above for handling the flocculent. Rotation of both beaches 210 and blades 408 is actuated by a common drive 502.

Rotation of beaches 210, baffles 220, 222 and scraper blades 408 functionally subdivides reservoir 104 into a plurality of separate influent treatment cells 610. Each cell 610 is further subdividable into a fill subzone 612 receiving influent infeed through ports 138 and a float subzone 614 which does not directly receive influent infeed and is therefore relatively quiescent. Rotation of beaches 210 and scraper blades 408 relative to troughs 306 causes the fill subzones 612 to progressively increase in size and the float subzones 614 to progressively decrease in size as described above. The floating flocculent within the float subzones 614 is thereby caused to gently spill into the flocculent collection troughs 306 in a timed sequence. A head difference is maintained between the flocculent collection troughs 306 and holding tank 124 within central hub 106 so that flocculent flows intermittently from troughs 306 into tank 124 without the use of pumps. The flocculent may comprise, for example, return activated sludge which is then recirculated through recycle line 160 to an upstream aerator, bioreactor or other processor. A non-recyclable fraction of the flocculent, such as waste activated sludge, is separately discharged from troughs 306 into discharge lines 132 (FIG. 5).

Figure 20:
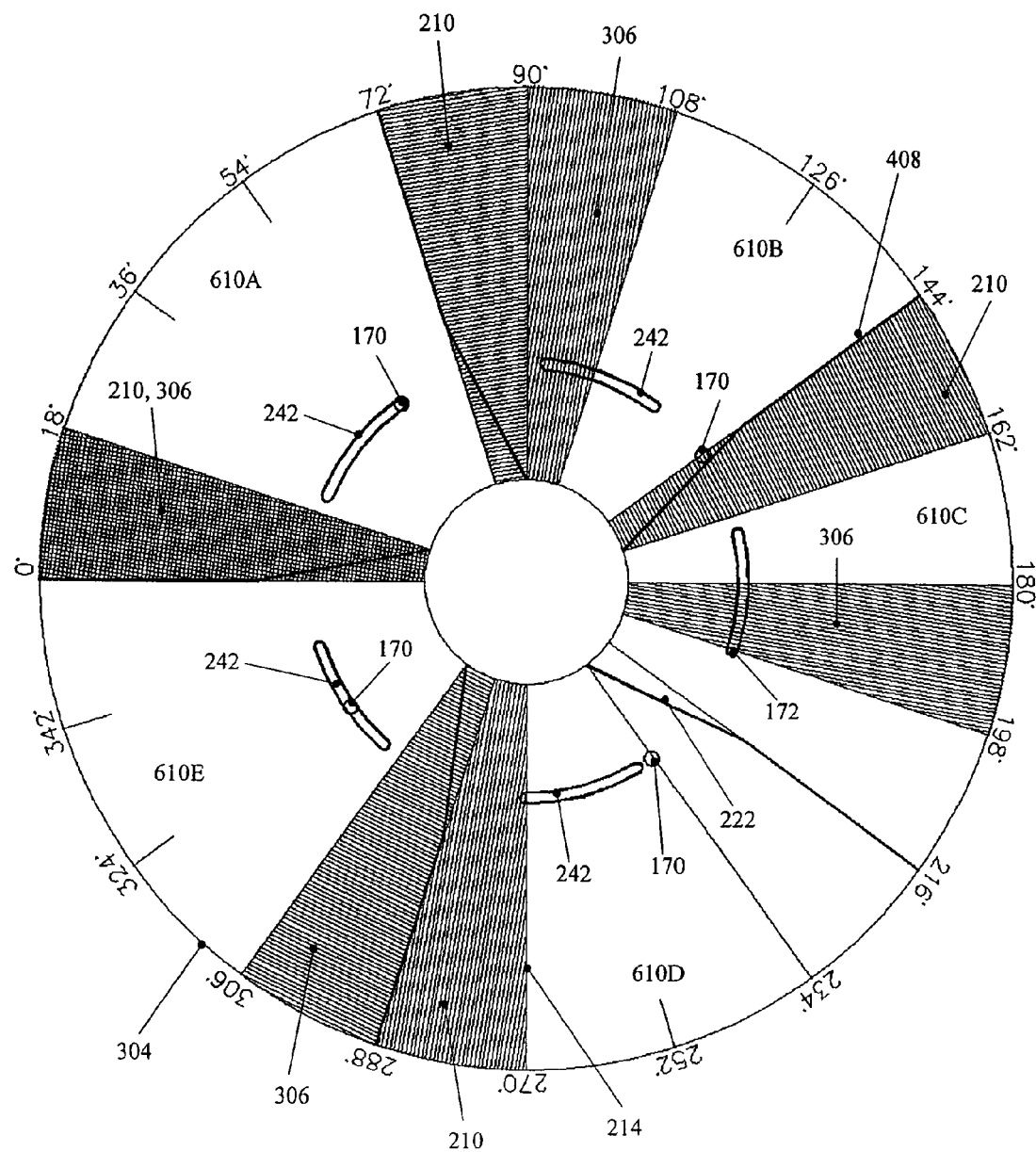
FIG. 20 is a simplified plan view showing the bottom recycle port timing relative to a rotating shutter ring.

In an alternative embodiment of the invention illustrated in a simplified, schematic form in FIG. 20 the recycle flow from reservoir 104 may be regulated in treatment cells 610 undergoing flotation. This feature may be particularly desirable in applications having a high recycle rate, such as biological nutrient removal applications. According to the embodiment, rotation of shutter ring 240 (FIG. 6) causes shutters 242 to periodically come into alignment with standpipe inlet ports 170 (FIG. 5). For example, depending upon the specific location of inlet ports 170 in sump 128, ports 170 could become opened when a shutter 242 extends thereover or passes thereunder. The primary purpose of this feature is to ensure that recycling of bottom solids does not occur in treatment cell(s) 610 undergoing flotation, thereby maintaining the mixed liquor in such treatment cell(s) in a relatively quiescent state. For example, in FIG. 20, only cells 610A and 610E are discharging bottom recycle from a lower portion thereof. In the other treatment cells 610 shutter 242 is not aligned with an inlet port 170. Other equivalent means for limiting solids recycle in treatment cells 610 undergoing flotation may be envisioned by a person skilled in the art.

As indicated above, influent is introduced into clarifier reservoir 104 continuously. Clarified effluent is also removed from clarifier 10 continuously from a perimeter weir 114 through effluent discharge conduit 122 (FIG. 5). The internal recycle stream described above helps balance varying influent and effluent flows and maintains the head difference between reservoir 104 and holding tank 124.

The scraper blades 408 traverse substantially all of the effective surface area of clarifier reservoir 104 between troughs 306. Each blade 408 is vertically displaced above its corresponding beach 210 when the blade 408 traverses past a trough 306 as described in detail above.

As will be apparent from the foregoing, clarifier 10 has several important operational advantages, including the following:

1. Although influent is introduced into clarifier 10 continuously, flocculent is permitted to float undisturbed in relatively quiescent float subzones 614 in a batch-like fashion.
2. Since mechanical handling of the float blanket is minimized, the clarifier 10 is particularly well suited to handling of fragile flocculent without the need to use polymers.
3. Due to the feed port overlap feature, both influent infeed and flotation, or influent infeed and drawing of flocculent from flocculent discharge troughs 306, may occur simultaneously in different subzones of the same treatment cell 610, thereby maximizing flotation efficiency.
4. The influent is introduced into a fill subzone which is expanding in size.
5. The discharge of flocculent into the flocculent collection troughs 306 is timed to stagger the intermittent load.
6. Flocculent can be discharged from the collection troughs 306 into the holding tank 124 for recycle without the use of pumps.
7. All of the rotating elements of the clarifier may be driven by a single drive means.
8. The scraper lifting mechanism converts radial horizontal movement to vertical movement. In particular, rotating movement of the scraper blade 408 along a radial line is temporarily halted while the scraper blade is displaced vertically along the front edge 314 of a flocculent collection trough 306. Rotating movement of blade 408 then resumes to enable blade 408 to traverse over trough 306 and descend on to or proximate an underlying beach 210. This feature ensures that the scraper blade 408 will traverse substantially all of the available surface area of the clarifier reservoir 104 between the flocculent collection troughs 306. Further, the scraper lifting functionality is achieved using a minimal number of mechanical parts and does not interfere with the operation of other flocculent handling assemblies 406 which continue to rotate within clarifier 10 at a constant velocity.

9. The circular design maximizes the effective length of the beaches 210. Since the beaches 210 are submerged and horizontally oriented, they provide shear planes beneath the surface float blanket.

10. The clarifier capacity can be adjusted by altering the landing spot of a scraper blade 408 on or proximate to a corresponding beach 210.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of treating liquid influent in a circular clarifier having a container for holding said influent and at least one trough extending at approximately the fill level of said influent within said container, said method comprising:
    (a) introducing said influent into a treatment region of said container in the vicinity of said trough;
    (b) causing a fraction of said influent comprising separable matter to form a surface layer of flocculent in a flotation subzone of said treatment region; and
    (c) confining said flocculent within said flotation subzone and gradually decreasing the volume of said flotation subzone to cause said flocculent to rise above said fill level and gently spill into said trough without substantially disrupting said flocculent,
wherein said clarifier comprises a rotatable flocculent handling assembly and wherein said step of gradually decreasing the volume of said flotation subzone comprises rotating said flocculent handling assembly through said treatment region, and wherein said flocculent handling assembly comprises a beach having a generally horizontally disposed upper surface, wherein said beach defines the lower boundary of said flotation subzone.

2. The method as defined in claim 1, wherein rotation of said flocculent handling assembly in said treatment region increases the concentration of said flocculent in said flotation subzone.

3. The method as defined in claim 2, wherein said flocculent handling assembly further comprises a scraper blade extending upwardly from said beach.

4. The method as defined in claim 1, wherein said separable matter is caused to form said surface layer of flocculent by a gas flotation process and wherein treatment region is operable in a fill phase, a float phase or a combination fill/float phase.

5. The method as defined in claim 4, wherein rotation of said flocculent handling assembly through said treatment region subdivides said region into said flotation subzone in advance of the direction of travel of said assembly and a fill subzone behind said assembly, wherein said influent is introduced into said fill subzone of said treatment region in said fill phase and said fill/float phase.

6. The method as defined in claim 1, wherein said trough is stationary and said flocculent handling assembly is movable relative to said trough.

7. The method as defined in claim 1, wherein said beach forms a fluid shear plane within said treatment region proximate a lower portion of said flocculent.

8. The method as defined in claim 1, wherein said influent is introduced into said container continuously.

9. The method as defined in claim 3, wherein said influent is introduced into said container continuously.

10. The method as defined in claim 9, wherein said clarifier comprises a plurality of radially-spaced apart troughs and a plurality of separate treatment regions, each of said treatment regions being defined between an adjacent pair of said troughs, wherein said influent is sequentially introduced into said treatment regions in a timed sequence such that said flocculent is substantially quiescent in at least some of said flotation subzones in advance of the direction of rotation of said flocculent handling assembly.

11. The method as defined in claim 10, wherein said scraper blade traverses substantially all of the exposed surface of said treatment regions as it rotates within said container.

12. The method as defined in claim 11, further comprising vertically displacing said scraper blade in the vicinity of each of said troughs to enable said scraper blade to pass thereover and then descend into the next-in-sequence one of said treatment regions.

13. The method as defined in claim 12, wherein said container is defined between a central hub and a peripheral wall of said clarifier, and wherein each of said troughs extends radially within said container at spaced locations, said central hub having a plurality of feed ports formed therein at spaced locations, wherein the step of introducing influent into said treatment regions in a timed sequence comprises rotating a first rotatable ring around said hub, said ring having a plurality of influent inlet ports which are sequentially brought into at least partial register with said feed ports to permit the passage of said influent therethrough.

14. The method as defined in claim 13, further comprising the step of periodically discharging at least part of said flocculent from each of said troughs into a holding tank disposed within said central hub.

15. The method as defined in claim 13, further comprising circulating said influent within an influent supply chamber in fluid communication with said feed ports, wherein said influent supply chamber continuously receives a supply of said influent from an influent source.

16. The method as defined in claim 15, wherein said influent supply chamber is located within said central hub and wherein said influent is circulated within said influent supply chamber in a first direction and is circulated within said container, after passage through said feed ports, in a second direction opposite said first direction.

17. The method as defined in claim 16, wherein said influent source is a bioreactor located upstream from said clarifier.

18. The method as defined in claim 17, further comprising mixing in said influent supply chamber a first stream of said influent comprising dissolved gas and a second stream of said influent comprising dispersed gas.

19. The method as defined in claim 14, wherein said holding tank is in fluid communication with a bioreactor located upstream from said clarifier and wherein said method further comprises recycling a portion of said influent to said holding tank.

20. The method as defined in claim 19, further comprising conveying sediments from a bottom portion of said conveyor to said holding tank.

21. The method as defined in claim 3, further comprising adjusting the position of said scraper blade relative to an upper surface of said beach.

22. The method as defined in claim 14, wherein said flocculent collected in each of said troughs comprises return activated sludge and waste activated sludge and wherein said method further comprises discharging said return activated sludge from said troughs into said holding tank and discharging said waste activated sludge from said troughs to a location separate from said holding tank.

23. The method as defined in claim 14, wherein said flocculent is discharged from each of said troughs into said holding tank sequentially.

24. The method as defined in claim 23, further comprising maintaining a hydraulic head difference between said troughs and said holding tank, whereby said flocculent periodically flows from each of said troughs into said holding tank without the use of pumps.

25. The method as defined in claim 24, wherein each of said troughs comprises a flocculent discharge port proximate said central hub and wherein said clarifier further comprises a rotatable ring having a plurality of spaced-apart flocculent outlet ports, said method further comprising rotating said rotatable ring around said hub to periodically bring said discharge port into at least partial alignment with one of said outlet ports to permit passage of flocculent therethrough into said holding tank.

26. The method as defined in claim 12, wherein said scraper blade is supported for rotational movement by a leading support arm and a trailing supports arm and wherein said step of vertically displacing said scraper blade comprises adjusting the angular distance between said support arms in the vicinity of each of said troughs.

27. The method as defined in claim 26, further comprising maintaining said supports arms in a rotational plane extending above the plane of rotation of said scraper blade.

28. A method of treating liquid influent in a circular clarifier having a container for holding said influent and at least one trough extending at approximately the fill level of said influent within said container, said method comprising:
  (a) introducing said influent into a treatment region of said container in the vicinity of said trough;
  (b) causing a fraction of said influent comprising separable matter to form a surface layer of flocculent in a flotation subzone of said treatment region; and
  (c) confining said flocculent within said flotation subzone and gradually decreasing the volume of said flotation subzone to cause said flocculent to rise above said fill level and gently spill into said trough without substantially disrupting said flocculent,
  wherein said clarifier comprises a rotatable flocculent handling assembly and wherein said step of gradually decreasing the volume of said flotation subzone comprises rotating said flocculent handling assembly through said treatment region,
  wherein rotation of said flocculent handling assembly in said treatment region increases the concentration of said flocculent in said flotation subzone,
  wherein said flocculent handling assembly further comprises a scraper blade extending upwardly from said beach,
  wherein said influent is introduced into said container continuously,
  wherein said clarifier comprises a plurality of radially-spaced apart troughs and a plurality of separate treatment regions, each of said treatment regions being defined between an adjacent pair of said troughs,
  wherein said influent is sequentially introduced into said treatment regions in a timed sequence such that said flocculent is substantially quiescent in at least some of said flotation subzones in advance of the direction of rotation of said flocculent handling assembly,
  wherein said scraper blade traverses substantially all of the exposed surface of said treatment regions as it rotates within said container,
  the method further comprising vertically displacing said scraper blade in the vicinity of each of said troughs to enable said scraper blade to pass thereover and then descend into the next-in-sequence one of said treatment regions,
  wherein said container is defined between a central hub and a peripheral wall of said clarifier, and wherein each of said troughs extends radially within said container at spaced locations, said central hub having a plurality of feed ports formed therein at spaced locations, wherein the step of introducing influent into said treatment regions in a timed sequence comprises rotating a first rotatable ring around said hub, said ring having a plurality of influent inlet ports which are sequentially brought into at least partial register with said feed ports to permit the passage of said influent therethrough,
  the method further comprising the step of periodically discharging at least part of said flocculent from each of said troughs into a holding tank disposed within said central hub,
  wherein said flocculent collected in each of said troughs comprises return activated sludge and waste activated sludge and wherein said method further comprises discharging said return activated sludge from said troughs into said holding tank and discharging said waste activated sludge from said troughs to a location separate from said holding tank.

29. A method of treating liquid influent in a circular clarifier having a container for holding said influent and at least one trough extending at approximately the fill level of said influent within said container, said method comprising:
  (a) introducing said influent into a treatment region of said container in the vicinity of said trough;
  (b) causing a fraction of said influent comprising separable matter to form a surface layer of flocculent in a flotation subzone of said treatment region; and
  (c) confining said flocculent within said flotation subzone and gradually decreasing the volume of said flotation subzone to cause said flocculent to rise above said fill level and gently spill into said trough without substantially disrupting said flocculent,
  wherein said clarifier comprises a rotatable flocculent handling assembly and wherein said step of gradually decreasing the volume of said flotation subzone comprises rotating said flocculent handling assembly through said treatment region,
  wherein rotation of said flocculent handling assembly in said treatment region increases the concentration of said flocculent in said flotation subzone,
  wherein said flocculent handling assembly further comprises a scraper blade extending upwardly from said beach,
  wherein said influent is introduced into said container continuously, wherein said clarifier comprises a plurality of radially-spaced apart troughs and a plurality of separate treatment regions, each of said treatment regions being defined between an adjacent pair of said troughs, wherein said influent is sequentially introduced into said treatment regions in a timed sequence such that said flocculent is substantially quiescent in at least some of said flotation subzones in advance of the direction of rotation of said flocculent handling assembly, wherein said scraper blade traverses substantially all of the exposed surface of said treatment regions as it rotates within said container, the method further comprising vertically displacing said scraper blade in the vicinity of each of said troughs to enable said scraper blade to pass thereover and then descend into the next-in-sequence one of said treatment regions, wherein said container is defined between a central hub and a peripheral wall of said clarifier, and wherein each of said troughs extends radially within said container at spaced locations, said central hub having a plurality of feed ports formed therein at spaced locations, wherein the step of introducing influent into said treatment regions in a timed sequence comprises rotating a first rotatable ring around said hub, said ring having a plurality of influent inlet ports which are sequentially brought into at least partial register with said feed ports to permit the passage of said influent therethrough, the method further comprising the step of periodically discharging at least part of said flocculent from each of said troughs into a holding tank disposed within said central hub, wherein said flocculent is discharged from each of said troughs into said holding tank sequentially, the method further comprising maintaining a hydraulic head difference between said troughs and said holding tank, whereby said flocculent periodically flows from each of said troughs into said holding tank without the use of pumps, wherein each of said troughs comprises a flocculent discharge port proximate said central hub and wherein said clarifier further comprises a rotatable ring having a plurality of spaced-apart flocculent outlet ports, said method further comprising rotating said rotatable ring around said hub to periodically bring said discharge port into at least partial alignment with one of said outlet ports to permit passage of flocculent therethrough into said holding tank.

30. A method of treating liquid influent in a circular clarifier having a container for holding said influent and at least one trough extending at approximately the fill level of said influent within said container, said method comprising:

(a) introducing said influent into a treatment region of said container in the vicinity of said trough;

(b) causing a fraction of said influent comprising separable matter to form a surface layer of flocculent in a flotation subzone of said treatment region; and (c) confining said flocculent within said flotation subzone and gradually decreasing the volume of said flotation subzone to cause said flocculent to rise above said fill level and gently spill into said trough without substantially disrupting said flocculent, wherein said clarifier comprises a rotatable flocculent handling assembly and wherein said step of gradually decreasing the volume of said flotation subzone comprises rotating said flocculent handling assembly through said treatment region, wherein rotation of said flocculent handling assembly in said treatment region increases the concentration of said flocculent in said flotation subzone, wherein said flocculent handling assembly further comprises a scraper blade extending upwardly from said beach, wherein said influent is introduced into said container continuously, wherein said clarifier comprises a plurality of radially-spaced apart troughs and a plurality of separate treatment regions, each of said treatment regions being defined between an adjacent pair of said troughs, wherein said influent is sequentially introduced into said treatment regions in a timed sequence such that said flocculent is substantially quiescent in at least some of said flotation subzones in advance of the direction of rotation of said flocculent handling assembly, wherein said scraper blade traverses substantially all of the exposed surface of said treatment regions as it rotates within said container, the method further comprising vertically displacing said scraper blade in the vicinity of each of said troughs to enable said scraper blade to pass thereover and then descend into the next-in-sequence one of said treatment regions, wherein said scraper blade is supported for rotational movement by a leading support arm and a trailing supports arm and wherein said step of vertically displacing said scraper blade comprises adjusting the angular distance between said support arms in the vicinity of each of said troughs.

31. The method as defined in claim 30, further comprising maintaining said supports arms in a rotational plane extending above the plane of rotation of said scraper blade.

* * * * *